(12) United States Patent  (10) Patent No.: US 7,622,182 B2
Wang et al.  (45) Date of Patent: Nov. 24, 2009

(54) EMBEDDED INTERACTION CODE ENABLED DISPLAY

(75) Inventors: Jian Wang, Beijing (CN); Chunhui Zhang, Beijing (CN); Qiang Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 386 days.

(21) Appl. No.: 11/205,599

(22) Filed: Aug. 17, 2005

(65) Prior Publication Data

US 2007/0042165 A1 Feb. 22, 2007

(51) Int. Cl.
*B32B 5/16* (2006.01)
*G06F 3/041* (2006.01)
*G06F 3/033* (2006.01)
*G06K 9/20* (2006.01)

(52) U.S. Cl. .................. 428/204; 428/1.1; 428/1.5; 428/1.6; 345/179; 345/173; 382/312; 382/313; 382/314; 382/321

(58) Field of Classification Search ................. 428/204, 428/1.1, 1.5, 1.6; 345/173, 179; 382/312–324
See application file for complete search history.

(56) References Cited

U.S. PATENT DOCUMENTS

| | | |
|---|---|---|
| 4,686,329 A | 8/1987 | Joyce |
| 4,742,558 A | 5/1988 | Ishibashi et al. |
| 4,745,269 A | 5/1988 | Van Gils et al. |
| 4,829,583 A | 5/1989 | Monroe et al. |
| 4,941,124 A | 7/1990 | Skinner, Jr. |
| 5,032,924 A | 7/1991 | Brown et al. |
| 5,051,736 A | 9/1991 | Bennett et al. |
| 5,073,966 A | 12/1991 | Sato et al. |
| 5,146,552 A | 9/1992 | Cassorla et al. |
| 5,153,928 A | 10/1992 | Iizuka |
| 5,181,257 A | 1/1993 | Steiner et al. |

(Continued)

FOREIGN PATENT DOCUMENTS

CN  1303494  7/2001

(Continued)

OTHER PUBLICATIONS

PCT International Search Report, International Application No. PCT/US2006/032230, date of mailing Jan. 9, 2007, 3 pages.

(Continued)

*Primary Examiner*—Callie E Shosho
*Assistant Examiner*—Prashant J Khatri
(74) *Attorney, Agent, or Firm*—Perkins Coie LLP

(57) ABSTRACT

An embedded interaction code-enabled display includes: an outer transparency layer, an optional inner transparency layer, an optional infrared-reflection layer between the outer transparency layer and the inner transparency layer, an EIC dot pattern between the outer transparency layer and the infrared-reflection layer, and, optionally, transparency glue between the outer transparency layer and the infrared-reflection layer or the inner transparency layer. The outer transparency layer 1308 and the inner transparency layer may be glass, plastic, or a film. The EIC dot pattern may be printed on, or pressed onto, the inner side of the outer transparency layer. The EIC dot pattern may include an encoded surface identifier that identifies the embedded interaction code-enabled display. The encoded surface identifier may uniquely identify the embedded interaction code-enabled display.

18 Claims, 16 Drawing Sheets

U.S. PATENT DOCUMENTS

| | | |
|---|---|---|
| 5,196,875 A | 3/1993 | Stuckler |
| 5,235,654 A | 8/1993 | Anderson et al. |
| 5,243,149 A | 9/1993 | Comerford et al. |
| 5,247,137 A | 9/1993 | Epperson |
| 5,253,336 A | 10/1993 | Yamada |
| 5,288,986 A | 2/1994 | Pine et al. |
| 5,294,792 A | 3/1994 | Lewis et al. |
| 5,335,150 A | 8/1994 | Huang |
| 5,365,598 A | 11/1994 | Sklarew |
| 5,394,487 A | 2/1995 | Burger et al. |
| 5,398,082 A | 3/1995 | Henderson et al. |
| 5,414,227 A | 5/1995 | Schubert et al. |
| 5,442,147 A | 8/1995 | Burns et al. |
| 5,448,372 A | 9/1995 | Axman et al. |
| 5,450,603 A | 9/1995 | Davies |
| 5,454,054 A | 9/1995 | Iizuka |
| 5,471,533 A | 11/1995 | Wang et al. |
| 5,477,012 A | 12/1995 | Sekendur |
| 5,511,156 A | 4/1996 | Nagasaka |
| 5,546,515 A | 8/1996 | Mochizuki |
| 5,581,637 A | 12/1996 | Cass et al. |
| 5,581,682 A | 12/1996 | Anderson et al. |
| 5,587,558 A | 12/1996 | Matsushima et al. |
| 5,612,524 A | 3/1997 | Sant'Anselmo et al. |
| 5,626,620 A | 5/1997 | Kieval et al. |
| 5,629,499 A | 5/1997 | Flickinger et al. |
| 5,635,697 A | 6/1997 | Shellhammer et al. |
| 5,644,652 A | 7/1997 | Bellegarda et al. |
| 5,652,412 A | 7/1997 | Lazzouni et al. |
| 5,661,291 A | 8/1997 | Ahearn et al. |
| 5,661,506 A | 8/1997 | Lazzouni et al. |
| 5,670,897 A | 9/1997 | Kean |
| 5,686,718 A | 11/1997 | Iwai et al. |
| 5,692,073 A | 11/1997 | Cass |
| 5,719,884 A | 2/1998 | Roth et al. |
| 5,721,940 A | 2/1998 | Luther et al. |
| 5,726,435 A | 3/1998 | Hara et al. |
| 5,727,098 A | 3/1998 | Jacobson |
| 5,754,280 A | 5/1998 | Kato et al. |
| 5,756,981 A | 5/1998 | Roustaei et al. |
| 5,765,176 A | 6/1998 | Bloomberg |
| 5,774,602 A | 6/1998 | Taguchi et al. |
| 5,817,992 A | 10/1998 | D'Antonio |
| 5,818,436 A | 10/1998 | Imai et al. |
| 5,822,436 A | 10/1998 | Rhoads |
| 5,822,465 A | 10/1998 | Normile et al. |
| 5,825,015 A | 10/1998 | Chan et al. |
| 5,825,892 A | 10/1998 | Braudaway et al. |
| 5,850,058 A | 12/1998 | Tano et al. |
| 5,852,434 A | 12/1998 | Sekendur |
| 5,855,483 A | 1/1999 | Collins et al. |
| 5,855,594 A | 1/1999 | Olive et al. |
| 5,875,264 A | 2/1999 | Carlstrom |
| 5,890,177 A | 3/1999 | Moody et al. |
| 5,897,648 A | 4/1999 | Henderson |
| 5,898,166 A | 4/1999 | Fukuda et al. |
| 5,902,968 A | 5/1999 | Sato et al. |
| 5,937,110 A | 8/1999 | Petrie et al. |
| 5,939,703 A | 8/1999 | Hecht et al. |
| 5,960,124 A | 9/1999 | Taguchi et al. |
| 5,961,571 A | 10/1999 | Gorr et al. |
| 5,995,084 A | 11/1999 | Chan et al. |
| 6,000,614 A | 12/1999 | Yang et al. |
| 6,000,621 A * | 12/1999 | Hecht et al. ............ 235/494 |
| 6,000,946 A | 12/1999 | Snyders et al. |
| 6,005,973 A | 12/1999 | Seybold et al. |
| 6,041,335 A | 3/2000 | Merritt et al. |
| 6,044,165 A | 3/2000 | Perona et al. |
| 6,044,301 A | 3/2000 | Hartlaub et al. |
| 6,052,481 A | 4/2000 | Grajski et al. |
| 6,054,990 A | 4/2000 | Tran |
| 6,076,734 A | 6/2000 | Dougherty et al. |
| 6,081,261 A | 6/2000 | Wolff et al. |
| 6,108,453 A | 8/2000 | Acharya |
| 6,141,014 A | 10/2000 | Endo et al. |
| 6,151,424 A | 11/2000 | Hsu |
| 6,157,935 A | 12/2000 | Tran et al. |
| 6,181,329 B1 | 1/2001 | Stork et al. |
| 6,186,405 B1 | 2/2001 | Yoshioka et al. |
| 6,188,392 B1 | 2/2001 | O'Connor et al. |
| 6,192,380 B1 | 2/2001 | Light et al. |
| 6,202,060 B1 | 3/2001 | Tran |
| 6,208,771 B1 | 3/2001 | Jared et al. |
| 6,208,894 B1 | 3/2001 | Schulman et al. |
| 6,219,149 B1 | 4/2001 | Kawata et al. |
| 6,226,636 B1 | 5/2001 | Abdel-Mottaleb et al. |
| 6,230,304 B1 | 5/2001 | Groeneveld et al. |
| 6,243,071 B1 | 6/2001 | Shwarts et al. |
| 6,249,614 B1 | 6/2001 | Kolesnik et al. |
| 6,254,253 B1 | 7/2001 | Daum et al. |
| 6,256,398 B1 | 7/2001 | Chang |
| 6,259,827 B1 | 7/2001 | Nichani |
| 6,278,968 B1 | 8/2001 | Franz et al. |
| 6,294,775 B1 | 9/2001 | Seibel et al. |
| 6,310,988 B1 | 10/2001 | Flores et al. |
| 6,327,395 B1 | 12/2001 | Hecht et al. |
| 6,330,976 B1 | 12/2001 | Dymetman et al. |
| 6,335,727 B1 | 1/2002 | Morishita et al. |
| 6,340,119 B2 | 1/2002 | He et al. |
| 6,396,598 B1 | 5/2002 | Kashiwagi et al. |
| 6,408,330 B1 | 6/2002 | DeLaHuerga |
| 6,441,920 B1 | 8/2002 | Smith |
| 6,479,768 B1 | 11/2002 | How |
| 6,492,981 B1 | 12/2002 | Stork et al. |
| 6,517,266 B2 | 2/2003 | Saund |
| 6,522,928 B2 | 2/2003 | Whitehurst et al. |
| 6,529,638 B1 | 3/2003 | Westerman |
| 6,532,152 B1 | 3/2003 | White et al. |
| 6,538,187 B2 | 3/2003 | Beigi |
| 6,546,136 B1 | 4/2003 | Hull |
| 6,551,357 B1 | 4/2003 | Madduri |
| 6,560,741 B1 | 5/2003 | Gerety et al. |
| 6,570,104 B1 | 5/2003 | Ericson et al. |
| 6,570,997 B2 | 5/2003 | Noguchi |
| 6,573,887 B1 | 6/2003 | O'Donnell, Jr. |
| 6,577,299 B1 | 6/2003 | Schiller et al. |
| 6,580,424 B1 | 6/2003 | Krumm |
| 6,584,052 B1 | 6/2003 | Phillips et al. |
| 6,585,154 B1 | 7/2003 | Ostrover et al. |
| 6,592,039 B1 | 7/2003 | Smith et al. |
| 6,603,464 B1 | 8/2003 | Rabin |
| 6,625,313 B1 | 9/2003 | Morita et al. |
| 6,628,267 B2 | 9/2003 | Karidis et al. |
| 6,650,320 B1 | 11/2003 | Zimmerman |
| 6,655,597 B1 | 12/2003 | Swartz et al. |
| 6,661,920 B1 | 12/2003 | Skinner |
| 6,663,008 B1 | 12/2003 | Pettersson et al. |
| 6,671,386 B1 | 12/2003 | Shimizu et al. |
| 6,674,427 B1 | 1/2004 | Pettersson et al. |
| 6,681,045 B1 | 1/2004 | Lapstun et al. |
| 6,686,910 B2 | 2/2004 | O'Donnell, Jr. |
| 6,689,966 B2 | 2/2004 | Wiebe et al. |
| 6,693,615 B2 | 2/2004 | Hill et al. |
| 6,697,056 B1 | 2/2004 | Bergelson et al. |
| 6,728,000 B1 | 4/2004 | Lapstun et al. |
| 6,729,543 B1 | 5/2004 | Arons et al. |
| 6,731,271 B1 | 5/2004 | Tanaka et al. |
| 6,732,927 B2 | 5/2004 | Olsson et al. |
| 6,738,053 B1 | 5/2004 | Borgstrom et al. |
| 6,744,967 B2 | 6/2004 | Kaminski et al. |
| 6,752,317 B2 | 6/2004 | Dymetman et al. |
| 6,760,009 B2 | 7/2004 | Omura et al. |
| 6,783,069 B1 | 8/2004 | Hecht et al. |
| 6,819,776 B2 | 11/2004 | Chang |

| | | |
|---|---|---|
| 6,831,273 B2 | 12/2004 | Jenkins et al. |
| 6,832,724 B2 | 12/2004 | Yavid et al. |
| 6,834,081 B2 | 12/2004 | Kim et al. |
| 6,834,195 B2 | 12/2004 | Brandenberg et al. |
| 6,834,337 B1 | 12/2004 | Mitchell et al. |
| 6,847,356 B1 | 1/2005 | Hasegawa et al. |
| 6,856,712 B2 | 2/2005 | Fauver et al. |
| 6,862,371 B2 | 3/2005 | Mukherjee |
| 6,864,880 B2 | 3/2005 | Hugosson et al. |
| 6,865,325 B2 | 3/2005 | Ide et al. |
| 6,870,966 B1 | 3/2005 | Silverbrook et al. |
| 6,879,731 B2 | 4/2005 | Kang et al. |
| 6,880,124 B1 | 4/2005 | Moore |
| 6,897,854 B2 | 5/2005 | Cho et al. |
| 6,898,297 B2 | 5/2005 | Katsura et al. |
| 6,929,183 B2 | 8/2005 | Pettersson |
| 6,933,933 B2 | 8/2005 | Fleming |
| 6,938,222 B2 | 8/2005 | Hullender et al. |
| 6,956,968 B1 | 10/2005 | O'Dell et al. |
| 6,960,777 B2 | 11/2005 | Soar |
| 6,964,483 B2 | 11/2005 | Wang et al. |
| 6,968,083 B2 | 11/2005 | Williams et al. |
| 6,975,334 B1 | 12/2005 | Barrus |
| 6,976,220 B1 | 12/2005 | Lapstun et al. |
| 6,992,655 B2 | 1/2006 | Ericson et al. |
| 6,999,622 B2 | 2/2006 | Komatsu |
| 7,003,150 B2 | 2/2006 | Trajkovi |
| 7,009,594 B2 | 3/2006 | Wang et al. |
| 7,012,621 B2 | 3/2006 | Crosby et al. |
| 7,024,429 B2 | 4/2006 | Ngo et al. |
| 7,036,938 B2 | 5/2006 | Wang et al. |
| 7,048,198 B2 | 5/2006 | Ladas et al. |
| 7,092,122 B2 | 8/2006 | Iwaki |
| 7,110,604 B2 | 9/2006 | Olsson et al. |
| 7,111,230 B2 | 9/2006 | Euchner et al. |
| 7,116,840 B2 | 10/2006 | Wang et al. |
| 7,119,816 B2 | 10/2006 | Zhang et al. |
| 7,123,742 B2 | 10/2006 | Chang |
| 7,133,563 B2 | 11/2006 | Wang et al. |
| 7,136,054 B2 | 11/2006 | Wang et al. |
| 7,139,740 B2 | 11/2006 | Ayala |
| 7,142,197 B2 | 11/2006 | Wang et al. |
| 7,142,257 B2 | 11/2006 | Callison et al. |
| 7,145,556 B2 | 12/2006 | Pettersson |
| 7,167,164 B2 | 1/2007 | Ericson et al. |
| 7,176,906 B2 | 2/2007 | Williams et al. |
| 7,190,843 B2 | 3/2007 | Wei et al. |
| 7,222,799 B2 | 5/2007 | Silverbrook |
| 7,225,979 B2 | 6/2007 | Silverbrook et al. |
| 7,262,764 B2 | 8/2007 | Wang et al. |
| 7,263,224 B2 | 8/2007 | Wang et al. |
| 7,289,103 B2 | 10/2007 | Lapstun et al. |
| 7,292,370 B2 | 11/2007 | Iwaki |
| 7,293,240 B2 | 11/2007 | Lapstun et al. |
| 7,295,193 B2 | 11/2007 | Fahraeus |
| 7,330,605 B2 | 2/2008 | Wang et al. |
| 7,386,191 B2 | 6/2008 | Wang et al. |
| 7,400,777 B2 | 7/2008 | Wang et al. |
| 7,403,658 B2 | 7/2008 | Lin et al. |
| 7,421,439 B2 | 9/2008 | Wang et al. |
| 7,430,497 B2 | 9/2008 | Wang et al. |
| 7,440,134 B2 | 10/2008 | Natori |
| 7,463,784 B2 | 12/2008 | Kugo |
| 7,477,784 B2 | 1/2009 | Wang et al. |
| 7,486,822 B2 | 2/2009 | Wang et al. |
| 7,486,823 B2 | 2/2009 | Wang et al. |
| 7,502,508 B2 | 3/2009 | Wang et al. |
| 2001/0038383 A1 | 11/2001 | Ericson et al. |
| 2001/0053238 A1 | 12/2001 | Katsura et al. |
| 2002/0028018 A1 | 3/2002 | Hawkins et al. |
| 2002/0031622 A1 * | 3/2002 | Ippel et al. .......... 428/1.6 |
| 2002/0048404 A1 | 4/2002 | Fahraeus et al. |
| 2002/0050982 A1 | 5/2002 | Ericson |
| 2002/0069220 A1 | 6/2002 | Tran |
| 2002/0163511 A1 | 11/2002 | Sekendur |
| 2002/0179717 A1 | 12/2002 | Cummings et al. |
| 2003/0001020 A1 | 1/2003 | Kardach |
| 2003/0009725 A1 | 1/2003 | Reichenbach |
| 2003/0030638 A1 | 2/2003 | Astrom et al. |
| 2003/0034961 A1 * | 2/2003 | Kao ............................ 345/179 |
| 2003/0050803 A1 | 3/2003 | Marchosky |
| 2003/0081000 A1 | 5/2003 | Watanabe et al. |
| 2003/0088781 A1 | 5/2003 | ShamRao |
| 2003/0090475 A1 | 5/2003 | Paul et al. |
| 2003/0117378 A1 | 6/2003 | Carro |
| 2003/0128194 A1 | 7/2003 | Pettersson |
| 2003/0146883 A1 | 8/2003 | Zelitt |
| 2003/0159044 A1 | 8/2003 | Doyle et al. |
| 2003/0179906 A1 | 9/2003 | Baker et al. |
| 2003/0214553 A1 | 11/2003 | Dodge |
| 2003/0214669 A1 | 11/2003 | Saitoh |
| 2004/0032393 A1 | 2/2004 | Brandenberg et al. |
| 2004/0046744 A1 | 3/2004 | Rafii et al. |
| 2004/0085302 A1 | 5/2004 | Wang et al. |
| 2004/0086181 A1 | 5/2004 | Wang |
| 2004/0090429 A1 * | 5/2004 | Geaghan et al. ............. 345/173 |
| 2004/0128264 A1 | 7/2004 | Leung et al. |
| 2004/0136083 A1 | 7/2004 | Wang |
| 2004/0153649 A1 | 8/2004 | Rhoads et al. |
| 2004/0212553 A1 | 10/2004 | Wang et al. |
| 2004/0233163 A1 | 11/2004 | Lapstun et al. |
| 2005/0024324 A1 | 2/2005 | Tomasi et al. |
| 2005/0044164 A1 | 2/2005 | O'Farrell et al. |
| 2005/0052700 A1 | 3/2005 | Mackenzie et al. |
| 2005/0104909 A1 | 5/2005 | Okamura et al. |
| 2005/0106365 A1 | 5/2005 | Palmer et al. |
| 2005/0146518 A1 | 7/2005 | Wang et al. |
| 2005/0147281 A1 | 7/2005 | Wang et al. |
| 2005/0193292 A1 | 9/2005 | Lin et al. |
| 2006/0109263 A1 | 5/2006 | Wang et al. |
| 2006/0123049 A1 | 6/2006 | Wang et al. |
| 2006/0182309 A1 | 8/2006 | Wang et al. |
| 2006/0182343 A1 | 8/2006 | Lin et al. |
| 2006/0190818 A1 | 8/2006 | Wang et al. |
| 2006/0215913 A1 | 9/2006 | Wang et al. |
| 2006/0242560 A1 | 10/2006 | Wang et al. |
| 2006/0242562 A1 | 10/2006 | Wang et al. |
| 2006/0242622 A1 | 10/2006 | Wang et al. |
| 2006/0274948 A1 | 12/2006 | Wang et al. |
| 2007/0001950 A1 | 1/2007 | Zhang et al. |
| 2007/0003150 A1 | 1/2007 | Xu et al. |
| 2007/0041654 A1 | 2/2007 | Wang et al. |
| 2008/0025612 A1 | 1/2008 | Wang et al. |
| 2009/0027241 A1 | 1/2009 | Lin et al. |
| 2009/0067743 A1 | 3/2009 | Wang et al. |

FOREIGN PATENT DOCUMENTS

| | | |
|---|---|---|
| CN | 1352778 | 6/2002 |
| CN | 3143455 | 9/2003 |
| CN | 200610092487 | 9/2003 |
| EP | 0407734 | 1/1991 |
| EP | 0439682 | 8/1991 |
| EP | 0564708 | 10/1993 |
| EP | 0670555 | 9/1995 |
| EP | 0694870 | 1/1996 |
| EP | 0717368 | 6/1996 |
| EP | 0732666 | 9/1996 |
| EP | 0865166 | 9/1998 |
| EP | 1154377 | 11/2001 |
| EP | 1158456 | 11/2001 |
| EP | 1168231 | 1/2002 |
| EP | 1276073 | 1/2003 |
| EP | 1416435 | 5/2004 |
| GB | 2393149 | 3/2004 |
| JP | 63165584 | 7/1988 |

| | | |
|---|---|---|
| JP | 04253087 | 9/1992 |
| JP | 06006316 | 1/1994 |
| JP | 06209482 | 7/1994 |
| JP | 06230886 | 8/1994 |
| JP | 07020812 | 1/1995 |
| JP | 07225564 | 8/1995 |
| JP | 10215450 | 8/1998 |
| JP | 11308112 | 11/1999 |
| JP | 2000131640 | 5/2000 |
| JP | 2002529796 | 9/2000 |
| JP | 2002082763 | 3/2002 |
| JP | 2002108551 | 4/2002 |
| WO | WO-9630217 | 10/1996 |
| WO | WO-9960469 | 11/1999 |
| WO | WO-9965568 | 12/1999 |
| WO | WO-0025293 | 5/2000 |
| WO | WO-0072247 | 11/2000 |
| WO | WO-0073983 | 12/2000 |
| WO | WO-0126032 | 4/2001 |
| WO | WO-0148685 | 7/2001 |
| WO | WO-0171654 | 9/2001 |
| WO | WO-02077870 | 10/2002 |
| WO | WO2005106638 A2 * | 11/2005 |

OTHER PUBLICATIONS

Non-Final Office Action for U.S. Appl. No. 11/062,166, mail date Oct. 5, 2007, 19 pages.
Non-Final Office Action for U.S. Appl. No. 11/062,166, mail date Feb. 4, 2008, 23 pages.
U.S. Appl. No. 11/066,800, filed Feb. 25, 2005, Wang, et al.
U.S. Appl. No. 11/067,193, filed Feb. 25, 2005, Yang, et al.
U.S. Appl. No. 12/131,810, filed Jun. 2, 2008, Wang.
U.S. Appl. No. 12/138,339, filed Jun. 12, 2008, Wang et al.
U.S. Appl. No. 12/180,484, filed Jul. 25, 2008, Wang.
"Vpen, Revolutionizing Human Interaction With The Digital World™," OTM Technologies, pp. 1-6, Jul. 15, 2002.
Brush, A.J. et al., "Robust Annotation Positioning in Digital Documents," SIGCHI '01, Mar. 31-Apr. 4, 2001, ACM, Seattle, Washington, USA, pp. 285-292.
Cai, Z., "A New Decode Algorithm for Binary Bar Codes," Pattern Recognition Letters 15 (Dec. 1994), pp. 1191-1199.
Champaneria, "PADCAM: A Real-Time, Human-Centric Notetaking System," MIT Laboratory for Computer Science, Mar. 2002.
Clark et al., "Maximal and Near-Maximal Shift Register Sequences: Efficient Event Counters and Easy Discrete Logarithms," IEEE Transactions on Computers vol. 43, No. 5, pp. 560-568, May 1994.
Cotting, D. et al., "Embedding Imperceptible Patterns into Projected Images for Simultaneous Acquisition and Display," Proceedings of the Third IEEE and ACM International Symposium on Mixed and Augmented Reality, Nov. 2-5, 2004, IEEE Computer Society, Washington, DC, pp. 100-109.
Crowley et al., "*Thingss That See*," Communications of the A.C.M., vol. 43, No. 3, pp. 54-64, Mar. 2000.
Decurtins, C. et al., "Digital Annotation of Printed Documents," Proceedings of the Twelfth International Conference on Information and Knowledge Management Nov. 3-8, New Orleans, Louisiana, United States, CIKM'03. ACM 2003, pp. 552-555.
Dey, et al., "A Fast Algorithm for Computing the Euler No. of an Image and its VLSI Implementation," IEEE; 13th International Conference on VLSI Design, Jan. 2003.
Dumer et al., "Hardness of Approximating the Minimum Distance of a Linear Code," IEEE Symposium of Foundations of Computer Science, pp. 475-485, 1999.
European Search Report for Application No. EP 03021235; Applicant: Microsoft Corporation; Date of Mailing: Jun. 1, 2005 (2 pages).
European Search Report for Application No. EP 03021852; Applicant: Microsoft Corporation; Date of Mailing: Mar. 2, 2004 (3 pages).
European Search Report for Application No. EP 05000170.0-1527; Applicant: Microsoft Corporation; Date of Mailing: Jan. 6, 2005 (7 pages).
European Search Report for Application No. 03021224.5; Applicant: Microsoft Corporation; Date of Mailing: Jan. 1, 2005 (3 pages).
European Search Report for Application No. 03021236.9; Applicant: Microsoft Corporation; Date of Mailing: Sep. 16, 2005 (5 pages).
European Search Report for Application No. 03021237.7-1527, Applicant: Microsoft Corporation; Date of Mailing: Jan. 6, 2005 (4 pages).
European Search Report for Application No. EP050000749; Applicant: Microsoft Corporation; Date of Mailing: Apr. 26, 2007 (2 pages).
European Search Report, Application No. 03021238.5-1527; Applicant: Microsoft Corporation; Date of Mailing: Jun. 1, 2005 (6 pages).
Fujieda et al., "Development Of Pen-Shaped Scanners," Nec, vol. 51, No. 10, 1998.
Golovchinsky, G. and Denoue, L., "Moving Markup: Repositioning Freeform Annotations," UIST '02, Oct. 27-30, 2002, Paris, France, vol. 4, Issue 2, pp. 21-24.
Gonzalez, Rafael et al., "Digital Image Processing," Table of Contents and Preface, Second Edition, Prentice Hall, Upper Saddle River, New Jersey, 2002 (13 pages).
Grasso et al., "Augmenting Recommender Systems by Embedding Interfaces into Practices," pp. 267-275, 1999.
Guerrero, J.J. and Sagues, C. "From Lines to Homographies Between Uncalibrated Images," IX Symposium on Pattern Recognition and Image Analysis, VO4, 233-240, 2001.
Haynes, "Wacom PL-500," www.wacom.co.uk, Jul. 15, 2002.
Hecht, D.L., "Printed embedded data graphical user interfaces," Computer vol. 34, Issue 3, Mar. 2001, pp. 47-55.
IEEExplore # Search Session History, May 7, 2008, http://ieee.org/search/history.jsp, 1 page.
Internet Print Out: "(Electro-Magnetic Resonance) send and position sensing technology," Wacom, Technology, http://www.wacom-components.com/tech.asp, pp. 1-6, Jul. 15, 2002.
Internet Print Out: "Anoto Pen Bluetooth," Tabletpccorner, http://www.tabletpccorner.net, dated Sep. 5, 2003.
Internet Print Out: "Competitive Technologies' Investee Introduces N-Scribe Pen—Digital Ink Presents Wireless Pen At Demo 2001," Competitive Technologies, http://www.competitivetech, dated Sep. 5, 2003.
Internet Print Out: "Cordless Batteryless Pen," Wacom Penabled, Components, http://www.wacom.com/components/index.cfm, dated Jul. 15, 2002.
Internet Print Out: "DataGlyphs® : Embedding Digital Data," Parc Solutions, http://www.parc.com/solutions/dataglyphs/, dated Jul. 15, 2002.
Internet Print Out: "Digital Pens," http://www.anotofunctionality.com/navigate.asp?PageID=96, pp. 1-70, Sep. 26, 2002.
Internet Print Out: "Jot This—Nscribe Pen," PC Magazine, http://ww.pcmag.com/article2/0,4149,316500,00.asp, dated Jul. 15, 2002.
Internet Print Out: "Jot This—Nscribe Pen," PC Magazine, http://ww.pcmag.com/article2/0,4149,316500,00.asp, dated Sep. 5, 2003.
Internet Print Out: "Maxell Digital Pen To Use Anoto System," Gizmo, http://www.gizmo.com.au/, dated Sep. 5, 2003.
Internet Print Out: "Mimio—Products," Mimio, http://www.mimio.com, pp. 1-8, Sep. 5, 2003.
Internet Print Out: "*N-Scribe For Digital Writing*," Flash Commerce News, http://flashcommerce.com/articles/, dated Sep. 5, 2003.
Internet Print Out: "N-Scribe For Digital Writing," Mobileinfo.com, News issue #2001-15 (Apr. 2001), http://www.mobileinfo.com/News_2001/Issue15/Digital-nscribe.htm, dated Jul. 15, 2002.
Internet Print Out: "Navilite—Optical Opportunities—Bluetooth-enabled optical transition measurement technology paves the way for an untethered stylus that can write on any surface," vol. 8, Issue No. 34, Jul. 5-11, 2002. www.computerworld.com, dated Aug. 15, 2002.
Internet Print Out: "OTM Technologies—V Pen," searched http://www.otmtech.com/vpen3.asp, pp. 1-7, Jul. 15, 2002.
Internet Print Out: "PL-500—15.1 inch Screen Digital LCD Pen Tablet System," Wacom Graphics Tablet Solution, http://ap.wacm.co.jp/products/pl/contents/pl500.html, pp. 1-13, 2002.
Internet Print Out: "Preprocessing in the Npen++ System," http://www.is.cs.cmu.edu/mie/multimodal_npen_preproc.html, dated Aug. 8, 2002.
Internet Print Out: "RF Pen Sends Your Scribbles," Appliance Manufacturing Magazine, http://www.ammagazine.com. Dated Sep. 26, 2002.

Internet Print Out: "SMART Board Interactive Whiteboard," Smarttech, http://www.smarttech.com, pp. 1-26, Sep. 5, 2003.
Internet Print Out: "The Hot New Medium: Paper—How The Oldest Interface In The Book is Redrawing The Map Of The Networked World," http://www.wired.com/wired/, dated Sep. 5, 2003.
Internet Print Out: "Anoto functionality," News, dated Jul. 15, 2002.
Internet Print Out: "Anoto functionality," Showroom, dated Jul. 15, 2002.
Internet Print Out: "ChatPen CHA-30," Digital Pens, Anoto Functionality, dated Jul. 15, 2002.
Internet Print Out: "Cintig18SX —A Powerful New Way To Work Directly On The Screen," Wacom Technology, Cintig-Interactive Pen Display, dated Sep. 5, 2003.
Internet Print Out: "Communicate Digitally With Ordinary Pen and Paper," Anoto Functionality, dated Jul. 15, 2002.
Internet Print Out: "Creating A Global De Facto Standard," Anoto Functionality, dated Jul. 15, 2002.
Internet Print Out: "Daily News," dated Aug. 15, 2002.
Internet Print Out: "Digital Pens and Technical Data," Anoto Functionality, dated Jul. 15, 2002.
Internet Print Out: "Downloads," Anoto Functionality, dated Jul. 15, 2002.
Internet Print Out: "Optical Translation Measurement ($OTM^{SM}$)," Technologies, dated Jul. 15, 2002.
Internet Print Out: "Partners Supporting Anoto Functionality," Anoto Functionality, dated 15, 2002.
Internet Print Out: "Possibilities," Anoto Functionality, dated Jul. 15, 2002.
Internet Print Out: "Product $VPen^{SM}$," OTM Technologies, dated Jul. 15, 2002.
Internet Print Out: "Products—Get Everyone On The Same p.," Mimio, dated Sep. 5, 2003.
Internet Print Out: "Sensor Board and Pen," Wacom, Product, dated Jul. 15, 2002.
Internet Print Out: "The Solution," Anoto Functionality, dated Jul. 15, 2002.
Internet Print Out: "Vision and Mission," Anoto Functionality, dated Jul. 15, 2002.
Internet Print Out: "Wacom Displays Pressure-Sensitive Pen Sensor for Tablet PCs," Wacom, News, dated Jul. 15, 2002.
Internet Print Out: "Welcome To www.anoto.com," Anoto, dated Jul. 15, 2002.
Internet Printout—http://www.anoto.com: Construction, Sep. 5, 2003.
Internet Printout—http://www.anoto.com: Page template, Sep. 5, 2003.
Internet Printout—http://www.anoto.com: Paper and Printing, Sep. 5, 2003.
Internet Printout—http://www.anoto.com: Paper space, Sep. 5, 2003.
Internet Printout—http://www.anoto.com: Pattern, Sep. 5, 2003.
Internet Printout—http://www.anoto.com: Printers supporting Anoto functionality, Sep. 5, 2003.
Internet Printout—http://www.anotofunctionality.com: Anoto Functionality—Anoto pattern & digital paper, Sep. 26, 2002.
Internet Printout—http://www.anotofunctionality.com: Anoto Functionality—Anoto pattern & digital paper, Sep. 5, 2003.
Internet Printout—http://www.anotofunctionality.com: Anoto Functionality—Applications, Sep. 5, 2003.
Internet Printout—http://www.anotofunctionality.com: Anoto Functionality—Corporate applications, Sep. 5, 2003.
Internet Printout—http://www.anotofunctionality.com: Anoto Functionality—Digital notes, Sep. 5, 2003.
Internet Printout—http://www.anotofunctionality.com: Anoto Functionality—Digital paper, Sep. 26, 2002.
Internet Printout—http://www.anotofunctionality.com: Anoto Functionality—Digital paper, Sep. 5, 2003.
Internet Printout—http://www.anotofunctionality.com: Anoto Functionality—Digital pens Use with mobile phones, Sep. 5, 2003.
Internet Printout—http://www.anotofunctionality.com: Anoto Functionality—Digital Pens Use with personal computers, Sep. 26, 2002.
Internet Printout—http://www.anotofunctionality.com: Anoto Functionality—Digital Pens, Sep. 26, 2002.
Internet Printout—http://www.anotofunctionality.com: Anoto Functionality—Digital pens, Sep. 5, 2003.
Internet Printout—http://www.anotofunctionality.com: Anoto Functionality—Digital service, Sep. 26, 2002.
Internet Printout—http://www.anotofunctionality.com: Anoto Functionality—Digital service, Sep. 5, 2003.
Internet Printout—http://www.anotofunctionality.com: Anoto Functionality—E-mail, Sep. 5, 2003.
Internet Printout—http://www.anotofunctionality.com: Anoto Functionality—Fax, Sep. 5, 2003.
Internet Printout—http://www.anotofunctionality.com: Anoto Functionality—Freedom of expression, Sep. 26, 2002.
Internet Printout—http://www.anotofunctionality.com: Anoto Functionality—Graphical SMS, Sep. 5, 2003.
Internet Printout—http://www.anotofunctionality.com: Anoto Functionality—Hints & tips Using your digital paper, Sep. 5, 2003.
Internet Printout—http://www.anotofunctionality.com: Anoto Functionality—Hints & tips Using your digital pen, Sep. 5, 2003.
Internet Printout—http://www.anotofunctionality.com: Anoto Functionality—Hints & tips Using Your Digital Service, Sep. 5, 2003.
Internet Printout—http://www.anotofunctionality.com: Anoto Functionality—Hints & tips, Sep. 5, 2003.
Internet Printout—http://www.anotofunctionality.com: Anoto Functionality—How does it work?, Sep. 26, 2002.
Internet Printout—http://www.anotofunctionality.com: Anoto Functionality—Security, Sep. 5, 2003.
Internet Printout—http://www.anotofunctionality.com: Anoto Functionality—Software and additionals, Sep. 5, 2003.
Internet Printout—http://www.anotofunctionality.com: Anoto Functionality—What is Anoto functionality?, Sep. 5, 2003.
Internet Printout—http://www.anotofunctionality.com: Anoto Functionality—You to an organization, Sep. 26, 2002.
Internet Printout—http://www.anotofunctionality.com: Anoto Functionality—You to someone else, Sep. 26, 2002.
Internet Printout—http://www.anotofunctionality.com: Anoto Functionality—You to yourself, Sep. 26, 2002.
Internet Printout—http://www.anotofunctionality.com: Anoto® functionality brings digital life to paper products, Sep. 5, 2003.
Internet Printout—http://www.edgereview.com: The Edge—First Look: Digital Ink n-scribe, Sep. 5, 2003.
Internet Printout—http://www.flashcommerce.com: n-scribe For Digital Writing, Sep. 5, 2003.
Internet Printout—http://www.gizmo.com: Maxell Digital Pen to use Anoto system, Sep. 5, 2003.
Internet Printout—http://www.is.cs.cmu.edu: Final input representation, Aug. 8, 2002.
Internet Printout—http://www.is.cs.cmu.edu: Npen++, Aug. 8, 2002.
Internet Printout—http://www.mimio.com: Capture, Save and Share, Sep. 5, 2003.
Internet Printout—http://www.mimio.com: Mimio technology, Sep. 5, 2003.
Internet Printout—http://www.mimio.com: Turn your whiteboard into an interactive whiteboard, Sep. 5, 2003.
Internet Printout—http://www.pcmag.com: Jot This, Sep. 5, 2003.
Internet Printout—http://www.smarttech.com: Carnegie Mellon research ranks the SMART $Board^{SM}$ interactive whiteboard as fastest, most accurate way to interact with projected information, Sep. 5, 2003.
Internet Printout—http://www.smarttech.com: SMART Board Interactive Whiteboard—Front Projection Features, Sep. 5, 2003.
Internet Printout—http://www.smarttech.com: SMART Board Interactive Whiteboard—Q&A, Sep. 5, 2003.
Internet Printout—http://www.smarttech.com: SMART Board Interactive Whiteboard, Sep. 5, 2003.
Internet Printout—http://www.smarttech.com: SMART Camfire™, whiteboard camera system effortlessly saves dry-erase whiteboard notes, Sep. 5, 2003.
Internet Printout—http://www.smarttech.com: SMART Technologies Inc. awarded another U.S. patent for touch sensitive SMART Board™ technology, Sep. 5, 2003.

Internet Printout—http://wvvw.smarttech.com: SMART Technologies, Inc. Press Releases, Sep. 5, 2003.
Internet Printout—http://www.smarttech.com: SMART Technologies, Inc., New annotation and software functionality on all SMART Board™ Interactive Whiteboards, Sep. 5, 2003.
Internet Printout—http://www.smarttech.com: What's New, Sep. 5, 2003.
Internet Printout—http://www.smarttech.com: Press Releases—SMART launches Research Assistance Program, Sep. 5, 2003.
Internet Printout—http://www.smarttech.com: SMART Board Interactive Whiteboard Profiles—Sep. 5, 2003.
Internet Printout—http://www.smarttech.com: SMART Board Software Features—Sep. 5, 2003.
Internet Printout—http://www.tabletpccorner.com: Anoto Pen Bluetooth, Sep. 5, 2003.
Internet Printout—http://www.techtv.com: Nscribe Pen and Presenter-to-Go, Sep. 5, 2003.
Internet Printout—http://www.wacom.com: Cintiq—Interactive Pen Display, Sep. 5, 2003.
Internet Printout—http://www.wacom.com: Graphire2—Have more fun with digital phones, Sep. 5, 2003.
Internet Printout—http://www.wacom.com: Intuos2—The Professional Tablet, Sep. 5, 2003.
Internet Printout—http://www.wacom.com: intuos2, Sep. 5, 2003.
Internet Printout—http://www.wacom.com: Penabled Wacom, Sep. 5, 2003.
Internet Printout—http://www.wacom.com: tablet PC, Sep. 5, 2003.
Internet Printout—http://www.wired.com: The Hot New Medium: Paper, Sep. 5, 2003.
Jelinek, Frederic, "Statistical Methods for Speech Recognition," The MIT Press, pp. 1-283, 2001.
Ko et al., "Finger Mouse and Gesture Recognition System As A New Human Computer Interface," Computer and Graphics, col. 21, No. 5, pp. 555-561, 1997.
Lau, R., "Adaptive Statistical Language Modeling," Submitted to the Dept. of Electrical Engineering and Computer Science in Partial Fulfillment for the Degree of Master of Science at the MIT, May 1994.
Lee, Kai-Fu, "Automatic Speech Recognition—The Development of the SPHINX System," Kluwer Academic Publishers, pp. 1-207, 1992.
Louderback, Jim, "Nscribe pen and Presenter-To-Go—Infrared Pen and New Springboard Module Make Their Debut At Demo 2001," Edgereview.com, http://www.techtv.com/freshgear.pr, dated Sep. 5, 2003.
Moran, et al., "Design and Technology for Collaborage: Collaborative Collages of Information on Physical Walls," Nov. 1999.
Munich, M.E.; Perona, P., "Visual Input for Pen-Based Computers," Image Processing, 1996, Proceedings International Conference on Sep. 16-19, 1996. vol. 1, pp. 173-176.
Nathan, K.S. et al., "On-Line Handwriting Recognition Using Continuous Parameter Hidden Markov Models," 1993 IEEE.
Okad, et al. "A Method for Document Digitizer by Real Time Assembling of Mosaic Pictures," Scripta Publishing Co., Systems, Computers, Controls, vol. 13, No. 5, Sep. 1982, pp. 74-80.
Okada et al., "A High-Resolution Handwriting Character Input Device Using Laser Beams," Department of Instrumentation Engineering, Faculty of Science and Technology, vol. 10.4, No. 11.1, 1981.
Otsu, Nobuyuki, "A Threshold Selection Method From Gray-Level Histogram," IEEE Transactions on Systems, Man, And Cybemetics; Jan. 1979, vol. SMC-9, No. 1, pp. 62-66.
Pursley, M. et al., "Numerical Evaluation of Correlation Parameters for Optimal Phrases of Binar Register Sequences," Communications, IEEE Transactions on Oct. 1979, vol. 27, Issue 10, Part 1, pp. 1597-1604.
Reynaerts, D. et al., "Design of an advanced computer writing tool," Micro Machine and Human Science, 1995, Proceedings of the Sixth International Symposium, Nagoya, Japan, Oct. 4-6, 1995, pgs. 229-234.
Sato et al., "Novel device for Inputting Handwriting Trajectory," Ricoh Technical Report No. 27, Nov. 2001, pp. 52-59, http://www.ricoh.co.jp/rdc/techreport/No27/Ronbun/A2707.pdf.
Sato et al. "Video Tablet—2D Coordinate Input Device With OCD Camera," Osaka University, vol. J67-D, No. 6, Jun. 1984.
Shum, Heung-Yeung, et al., "Panoramic Image Mosaics," Microsoft Research Technical Report MSR-TR-97-23, 1997, 53 pages.
Tang, Xiaoou et al., "Video-based handwritten Chinese character recognition," Circuits and Systems for Video Technology, IEEE Transactions, Jan., 2005, vol. 15, Issue 1, pp. 167-174.
Urbanski, Brian, "Don't Break This Ink Pen," Edgereview.com, http://www.edgereview.com/ataglance.cfm?category=edge &ID=180, dated Jul. 15, 2002.
Urbanski, Brian, "Don't Break This Ink Pen," Edgereview.com, http://www.edgereview.com/ataglance.cfm?category=edge &ID=180, dated Sep. 5, 2003.
Van Liere, R. and Mulder, J.D., "Optical Tracking Using Projective Invariant Marker Pattern Properties," Virtual Reality, 2003. Proceedings, IEEE, Mar. 22-26, 2003, pp. 191-198.

* cited by examiner

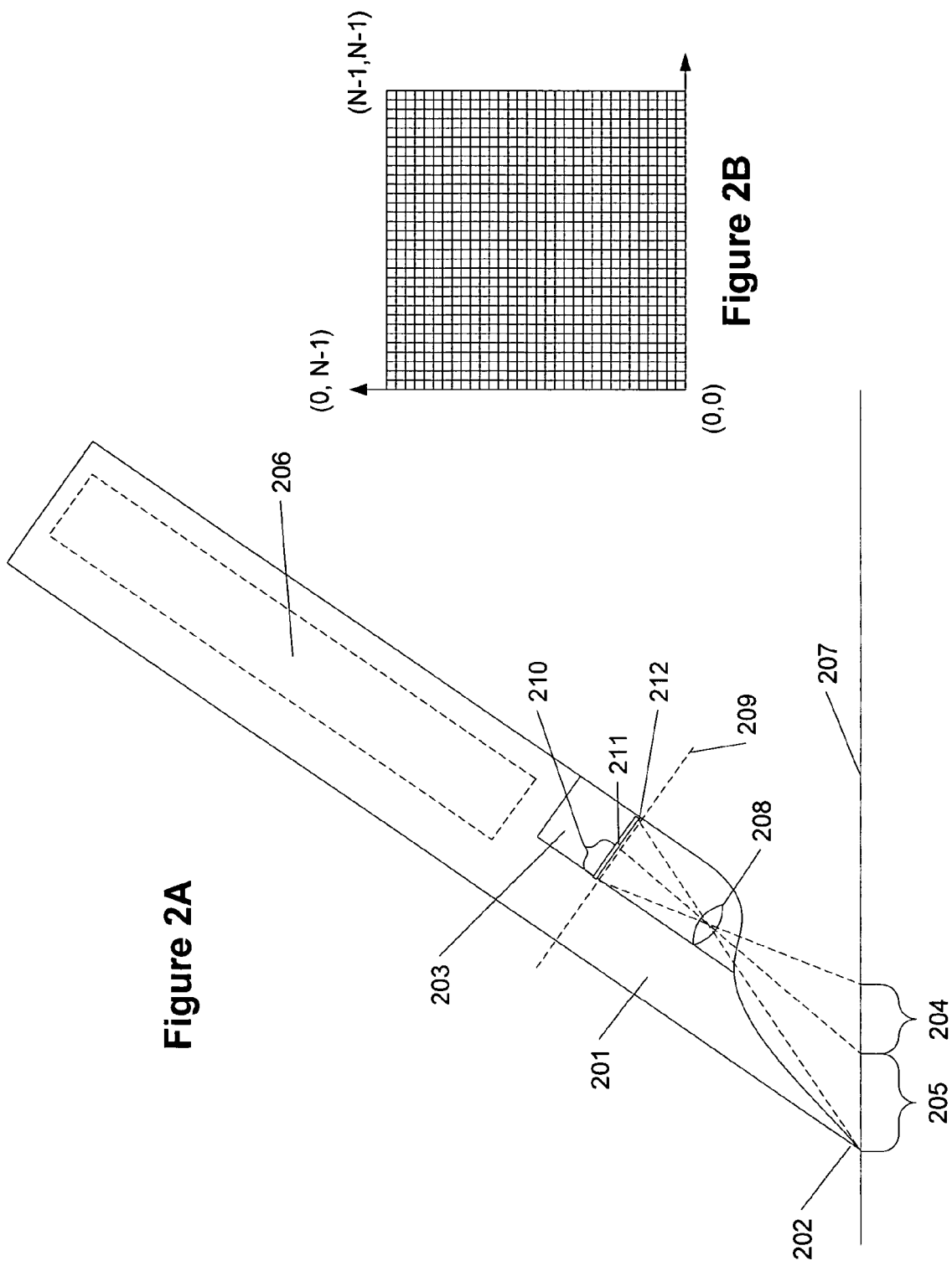

Figure 3A  0000010 00 01100 0101 001 111010 0 011001 0 010110 111 0110 01101 01 0111111
Figure 3B  0000000 0011101 0100111 1110100 0111010 1000101 1110100 0100111 0011101
Figure 3C  000100100 001111110 010111101 010011001 011100111 001011010 011000011
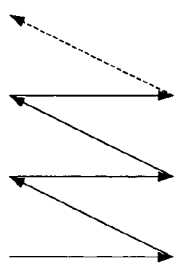
Figure 3D
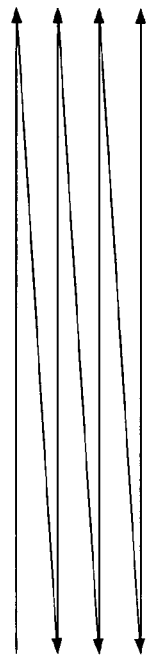
Figure 3E
Figure 3F

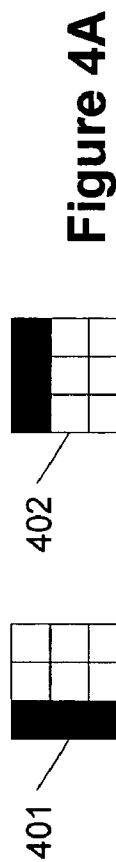
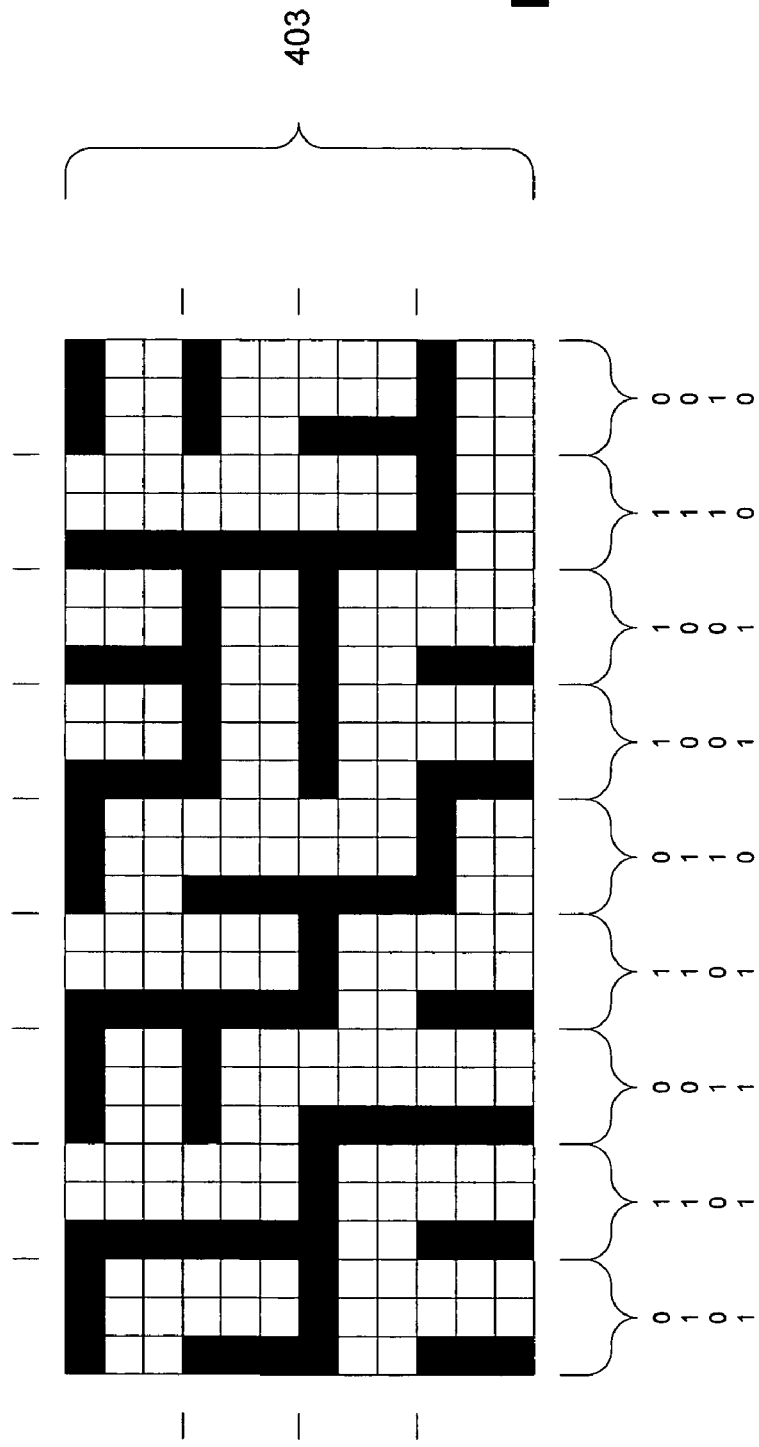
Figure 4A
Figure 4B

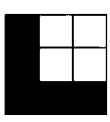 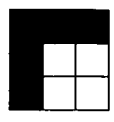 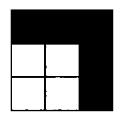 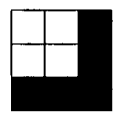
Figure 5A  Figure 5B  Figure 5C  Figure 5D
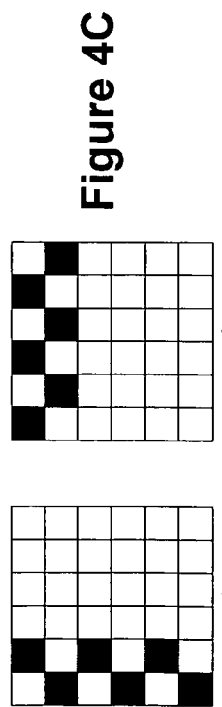
Figure 4C
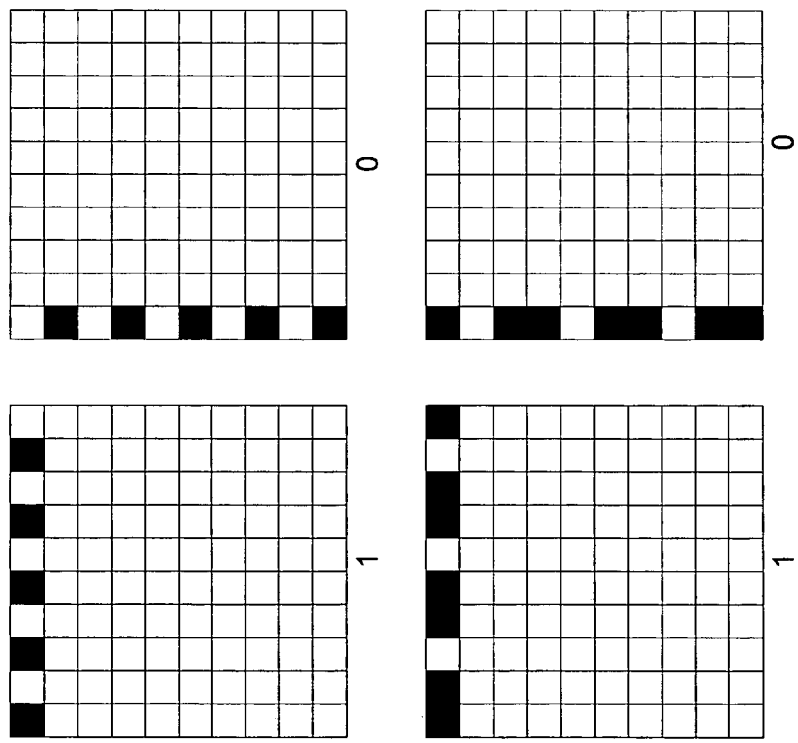
Figure 4D  Figure 4E $$o = \theta + \begin{cases} 0 - no\ a \\ \dfrac{\pi}{2} - no\ b \\ \pi - no\ c \\ \dfrac{3\pi}{2} - no\ d \end{cases}$$

EMBEDDED INTERACTION CODE ENABLED DISPLAY

BACKGROUND

Computer users are accustomed to using a mouse and keyboard as a way of interacting with a personal computer. While personal computers provide a number of advantages over written documents, most users continue to perform certain functions using printed paper. Some of these functions include reading and annotating written documents. In the case of annotations, the printed document assumes a greater significance because of the annotations made on it by the user. One of the difficulties, however, with having a printed document with annotations is the need to have the annotations subsequently entered back into the electronic form of the document. This requires the original user or another user to wade through the annotations and enter them into a personal computer. In some cases, a user will scan in the annotations and the original text, thereby creating a new document. These multiple steps make the interaction between the printed document and the electronic version of the document difficult to handle on a repeated basis. Further, scanned-in images are frequently non-modifiable. There may be no way to separate the annotations from the original text. This makes using the annotations difficult. Accordingly, an improved way of handling annotations would be desirable.

One technique for capturing handwritten information is by using an image capturing pen whose location may be determined during writing. One image capturing pen that provides this capability is the Anoto pen by Anoto Inc. This pen functions by using a camera to capture an image of paper encoded with a predefined pattern. An example of the image pattern is shown in FIG. 11. This pattern is used by the Anoto pen to determine a location of the pen on a piece of paper (or other positionally encoded medium).

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An embedded interaction code-enabled display includes: an outer transparency layer, an optional inner transparency layer, an optional infrared-reflection layer between the outer transparency layer and the inner transparency layer, an EIC dot pattern between the outer transparency layer and the infrared-reflection layer, and, optionally, transparency glue between the outer transparency layer and the infrared-reflection layer or the inner transparency layer. The outer transparency layer and the inner transparency layers may be glass, plastic, or a film. The EIC dot pattern may be printed on, or pressed onto, the inner side of the outer transparency layer. The EIC dot pattern may include an encoded surface identifier that identifies the embedded interaction code-enabled display. The encoded surface identifier may uniquely identify the embedded interaction code-enabled display.

BRIEF DESCRIPTION OF THE DRAWINGS

The foregoing Summary, as well as the following Detailed Description, is better understood when read in conjunction with the accompanying drawings, which are included by way of example, and not by way of limitation, with regard to the claimed invention.

FIGS. 2A and 2B show an image capture system and corresponding captured image in accordance with embodiments of the present invention.

FIGS. 3A through 3F show various sequences and folding techniques in accordance with embodiments of the present invention.

FIGS. 4A through 4E show various encoding systems in accordance with embodiments of the present invention.

FIGS. 5A through 5D show four possible resultant corners associated with the encoding system according to FIGS. 4A and 4B.

DETAILED DESCRIPTION

"Pen" as used herein means any writing implement that may or may not include the ability to store ink. In some examples, a stylus with no ink capability may be used as a pen in accordance with embodiments of the present invention.

"Camera" as used herein means an image capture system that captures an image from paper or any other medium.

General Purpose Computer

Figure 1:
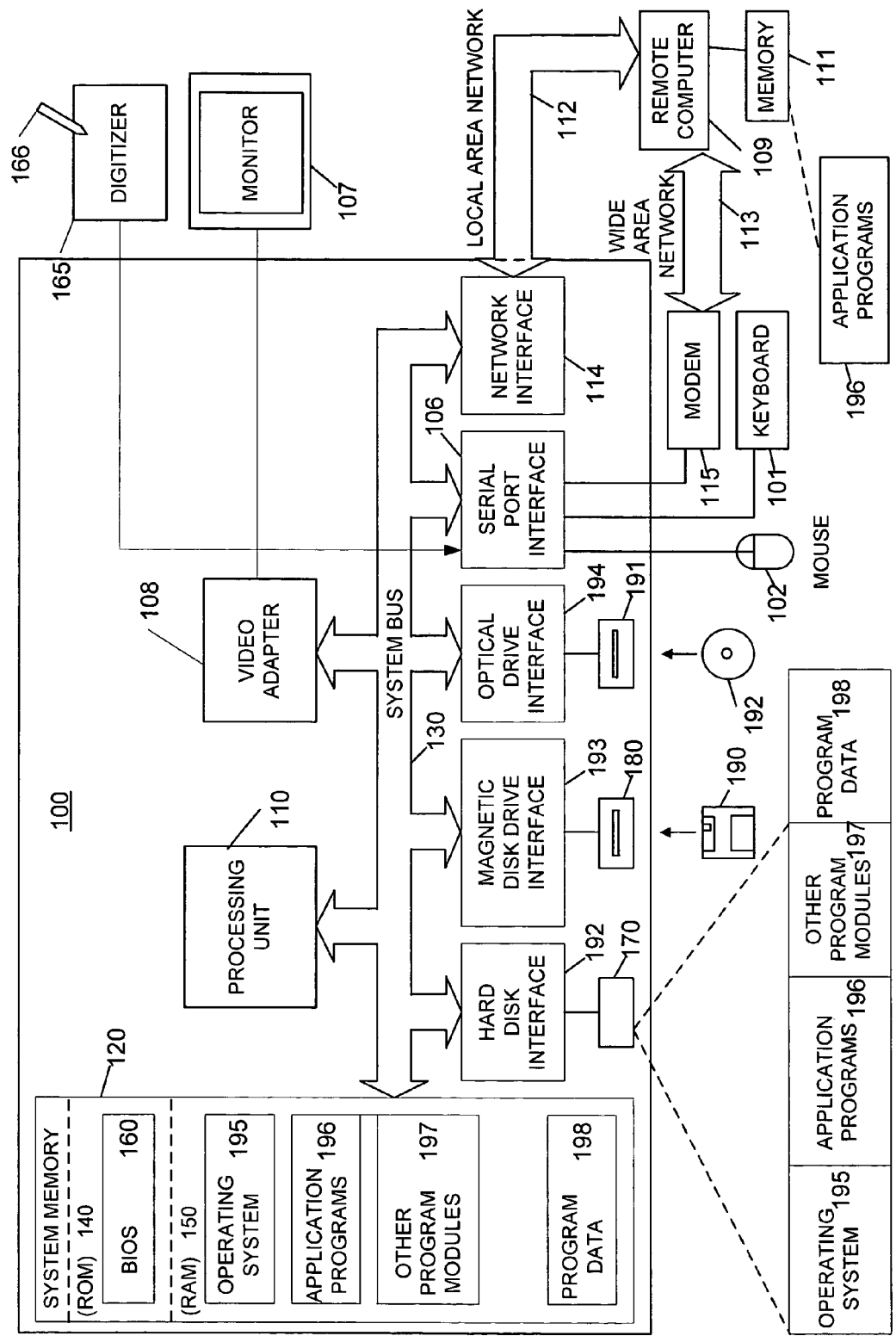
FIG. 1 shows a general description of a computer that may be used in conjunction with embodiments of the present invention.

FIG. 1 is a functional block diagram of an example of a conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between the pen digitizer 165 and the serial port is shown, in practice, the pen digitizer 165 may be coupled to the processing unit 110 directly, via a parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP, Bluetooth, IEEE 802.11x and the like is presumed, and the system can be operated in a client-server configuration to permit a user to retrieve web pages from a web-based server. Any of various conventional web browsers can be used to display and manipulate data on web pages.

Image Capturing Pen

Aspects of the present invention include placing an encoded data stream in a displayed form that represents the encoded data stream. (For example, as will be discussed with FIG. 4B, the encoded data stream is used to create a graphical pattern.) The displayed form may be printed paper (or other physical medium) or may be a display projecting the encoded data stream in conjunction with another image or set of images. For example, the encoded data stream may be represented as a physical graphical image on the paper or a graphical image overlying the displayed image (e.g., representing the text of a document) or may be a physical (non-modifiable) graphical image on a display screen (so any image portion captured by a pen is locatable on the display screen).

This determination of the location of a captured image may be used to determine the location of a user's interaction with the paper, medium, or display screen. In some aspects of the present invention, the pen may be an ink pen writing on paper. In other aspects, the pen may be a stylus with the user writing on the surface of a computer display. Any interaction may be provided back to the system with knowledge of the encoded image on the document or supporting the document displayed on the computer screen. By repeatedly capturing images with a camera in the pen or stylus as the pen or stylus traverses a document, the system can track movement of the stylus being controlled by the user. The displayed or printed image may be a watermark associated with the blank or content-rich paper or may be a watermark associated with a displayed image or a fixed coding overlying a screen or built into a screen.

FIGS. 2A and 2B show an illustrative example of pen 201 with a camera 203. Pen 201 includes a tip 202 that may or may not include an ink reservoir. Camera 203 captures an image 204 from surface 207. Pen 201 may further include additional sensors and/or processors as represented in broken box 206. These sensors and/or processors 206 may also include the ability to transmit information to another pen 201 and/or a personal computer (for example, via Bluetooth or other wireless protocols).

FIG. 2B represents an image as viewed by camera 203. In one illustrative example, the field of view of camera 203 (i.e., the resolution of the image sensor of the camera) is 32×32 pixels (where N=32). In the embodiment, a captured image (32 pixels by 32 pixels) corresponds to an area of approximately 5 mm by 5 mm of the surface plane captured by camera 203. Accordingly, FIG. 2B shows a field of view of 32 pixels long by 32 pixels wide. The size of N is adjustable, such that a larger N corresponds to a higher image resolution. Also, while the field of view of the camera 203 is shown as a square for illustrative purposes here, the field of view may include other shapes as is known in the art.

The images captured by camera 203 may be defined as a sequence of image frames $\{I_i\}$, where $I_i$ is captured by the pen 201 at sampling time $t_i$. The sampling rate may be large or small, depending on system configuration and performance requirement. The size of the captured image frame may be large or small, depending on system configuration and performance requirement.

The image captured by camera 203 may be used directly by the processing system or may undergo pre-filtering. This pre-filtering may occur in pen 201 or may occur outside of pen 201 (for example, in a personal computer).

The image size of FIG. 2B is 32×32 pixels. If each encoding unit size is 3×3 pixels, then the number of captured encoded units would be approximately 100 units. If the encoding unit size is 5×5 pixels, then the number of captured encoded units is approximately 36.

FIG. 2A also shows the image plane 209 on which an image 210 of the pattern from location 204 is formed. Light received from the pattern on the object plane 207 is focused by lens 208. Lens 208 may be a single lens or a multi-part lens system, but is represented here as a single lens for simplicity. Image capturing sensor 211 captures the image 210.

The image sensor 211 may be large enough to capture the image 210. Alternatively, the image sensor 211 may be large enough to capture an image of the pen tip 202 at location 212. For reference, the image at location 212 is referred to as the virtual pen tip. It is noted that the virtual pen tip location with respect to image sensor 211 is fixed because of the constant relationship between the pen tip, the lens 208, and the image sensor 211.

The following transformation $F_{S \to P}$ transforms position coordinates in the image captured by camera to position coordinates in the real image on the paper:

$$L_{paper} = F_{S \to P}(L_{Sensor}).$$

During writing, the pen tip and the paper are on the same plane. Accordingly, the transformation from the virtual pen tip to the real pen tip is also $F_{S \to P}$:

$$L_{pentip} = F_{S \to P}(L_{virtual-pentip}).$$

The transformation $F_{S \to P}$ may be estimated as an affine transform, which approximates $F_{S \to P}$ as:

$$F'_{S \to P} = \begin{bmatrix} \frac{\sin\theta_y}{s_x} & \frac{\cos\theta_y}{s_x} & 0 \\ \frac{-\sin\theta_x}{s_y} & \frac{\cos\theta_x}{s_y} & 0 \\ 0 & 0 & 1 \end{bmatrix},$$

in which $\theta_x$, $\theta_y$, $s_x$, and $s_y$ are the rotation and scale of two orientations of the pattern captured at location 204. Further, one can refine $F'_{S \to P}$ by matching the captured image with the corresponding real image on paper. "Refine" means to get a more precise estimation of the transformation $F_{S \to P}$ by a type of optimization algorithm referred to as a recursive method. The recursive method treats the matrix $F'_{S \to P}$ as the initial value. The refined estimation describes the transformation between S and P more precisely.

Next, one can determine the location of virtual pen tip by calibration.

One places the pen tip 202 on a fixed location $L_{pentip}$ on paper. Next, one tilts the pen, allowing the camera 203 to capture a series of images with different pen poses. For each image captured, one may obtain the transformation $F_{S \to P}$. From this transformation, one can obtain the location of the virtual pen tip $L_{virtual-pentip}$:

$$L_{virtual-pentip} = F_{P \to S}(L_{pentip}),$$

where $L_{pentip}$ is initialized as (0, 0) and $$F_{P \to S} = (F_{S \to P})^{-1}.$$

By averaging the $L_{virtual-pentip}$ obtained from each image, a location of the virtual pen tip $L_{virtual-pentip}$ may be determined. With $L_{virtual-pentip}$, one can get a more accurate estimation of $L_{pentip}$. After several times of iteration, an accurate location of virtual pen tip $L_{virtual-pentip}$ may be determined.

The location of the virtual pen tip $L_{virtual-pentip}$ is now known. One can also obtain the transformation $F_{S \to P}$ from the images captured. Finally, one can use this information to determine the location of the real pen tip $L_{pentip}$:

$$L_{pentip} = F_{S \to P}(L_{virtual-pentip}).$$

Encoding of Array

A two-dimensional array may be constructed by folding a one-dimensional sequence. Any portion of the two-dimensional array containing a large enough number of bits may be used to determine its location in the complete two-dimensional array. However, it may be necessary to determine the location from a captured image or a few captured images. So as to minimize the possibility of a captured image portion being associated with two or more locations in the two-dimensional array, a non-repeating sequence may be used to create the array. One property of a created sequence is that the sequence does not repeat over a particular length (or window size). The following describes the creation of the one-dimensional sequence then the folding of the sequence into an array.

Sequence Construction

A sequence of numbers may be used as the starting point of the encoding system. For example, a sequence (also referred to as an m-sequence) may be represented as a q-element set in field $F_q$. Here, $q=p^n$, where $n \geq 1$ and p is a prime number. The sequence or m-sequence may be generated by a variety of different techniques including, but not limited to, polynomial division. Using polynomial division, the sequence may be defined as follows:

$$\frac{R_l(x)}{P_n(x)},$$

where $P_n(x)$ is a primitive polynomial of degree n in field $F_q[x]$ (having $q^n$ elements). $R_l(x)$ is a nonzero polynomial of degree l (where l<n) in field $F_q[x]$. The sequence may be created using an iterative procedure with two steps: first, dividing the two polynomials (resulting in an element of field $F_q$) and, second, multiplying the remainder by x. The computation stops when the output begins to repeat. This process may be implemented using a linear feedback shift register as set forth in an article by Douglas W. Clark and Lih-Jyh Weng, "Maximal and Near-Maximal Shift Register Sequences: Efficient Event Counters and Easy Discrete Logarithms," IEEE Transactions on Computers 43.5 (May 1994, pp 560-568). In this environment, a relationship is established between cyclical shifting of the sequence and polynomial $R_l(x)$: changing $R_l(x)$ only cyclically shifts the sequence and every cyclical shifting corresponds to a polynomial $R_l(x)$. One of the properties of the resulting sequence is that, the sequence has a period of $q^n-1$ and within a period, over a width (or length) n, any portion exists once and only once in the sequence. This is called the "window property". Period $q^n-1$ is also referred to as the length of the sequence and n as the order of the sequence. In our implementation, q is chosen as 2.

The process described above is but one of a variety of processes that may be used to create a sequence with the window property.

Array Construction

The array (or m-array) that may be used to create the image (of which a portion may be captured by the camera) is an extension of the one-dimensional sequence or m-sequence. Let A be an array of period $(m_1, m_2)$, namely $A(k+m_1,l)=A(k,l+m_2)=A(k,l)$. When an $n_1 \times n_2$ window shifts through a period of A, all the nonzero $n_1 \times n_2$ matrices over $F_q$ appear once and only once. This property is also referred to as a "window property" in that each window is unique. A widow may then be expressed as an array of period $(m_1, m_2)$ (with $m_1$ and $m_2$ being the horizontal and vertical number of bits present in the array) and order $(n_1, n_2)$.

A binary array (or m-array) may be constructed by folding the sequence. One approach is to obtain a sequence then fold it to a size of $m_1 \times m_2$ where the length of the array is $L=m_1 \times m_2=2^n-1$. Alternatively, one may start with a predetermined size of the space that one wants to cover (for example, one sheet of paper, 30 sheets of paper or the size of a computer monitor), determine the area $(m_1 \times m_2)$, then use the size to let $L \geq m_1 \times m_2$, where $L=2^n-1$.

A variety of different folding techniques may be used. For example, FIGS. 3A through 3C show three different sequences. Each of these may be folded into the array shown as FIG. 3D. The three different folding methods are shown as the overlay in FIG. 3D and as the raster paths in FIGS. 3E and 3F. We adopt the folding method shown in FIG. 3D.

To create the folding method as shown in FIG. 3D, one creates a sequence $\{a_i\}$ of length L and order n. Next, an array $\{b_{kl}\}$ of size $m_1 \times m_2$, where $\gcd(m_1, m_2)=1$ and $L=m_1 \times m_2$, is created from the sequence $\{a_i\}$ by letting each bit of the array be calculated as shown by equation 1:

$$b_{kl}=a_i, \text{ where } k=i \bmod(m_1), l=i \bmod(m_2), i=0,\ldots,L-1. \quad (1)$$

This folding approach may be alternatively expressed as laying the sequence on the diagonal of the array, then continuing from the opposite edge when an edge is reached.

Figure 11:
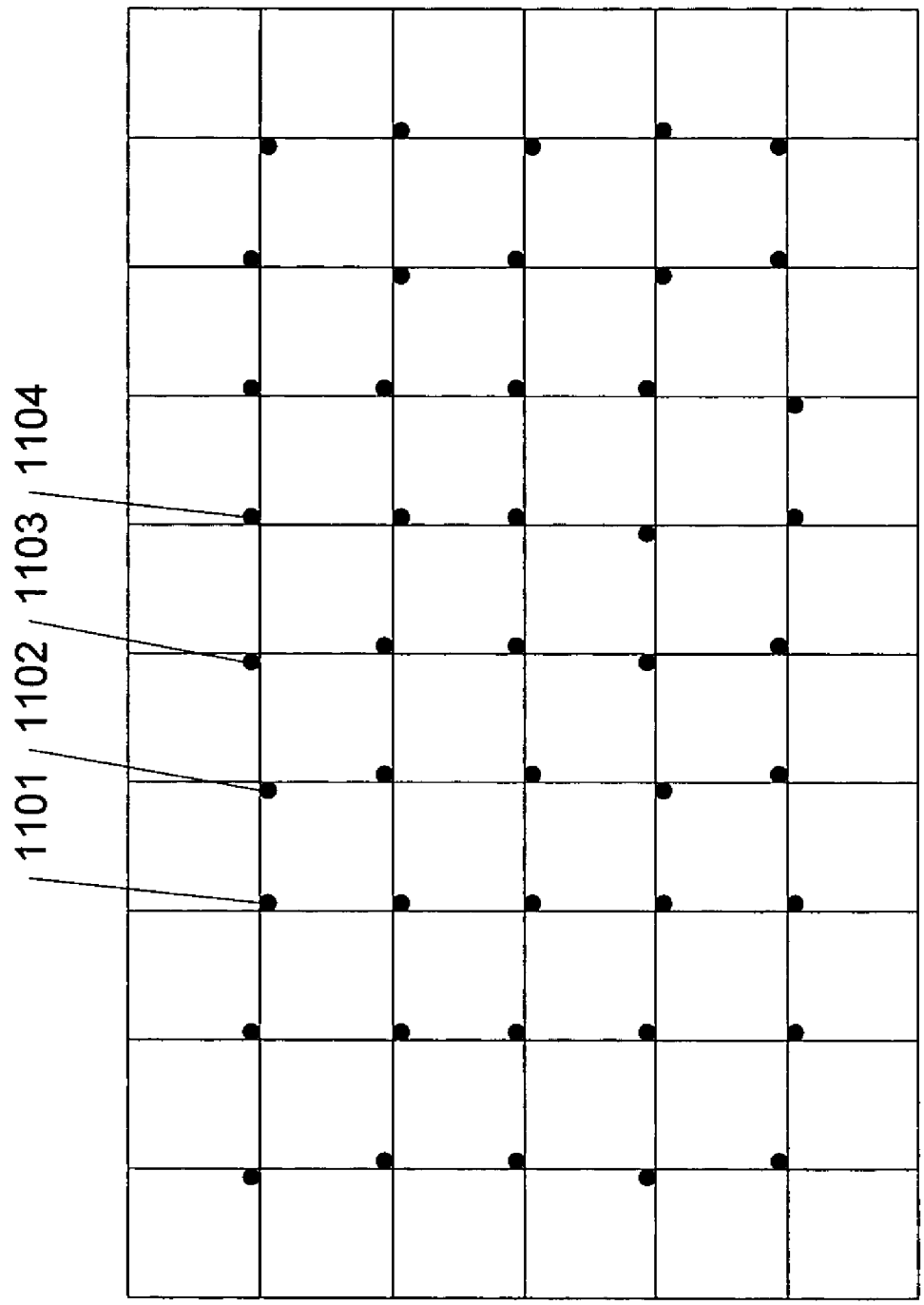
FIG. 11 shows a representation of encoding space in a document according to prior art.

FIG. 4A shows sample encoding techniques that may be used to encode the array of FIG. 3D. It is appreciated that other encoding techniques may be used. For example, an alternative coding technique is shown in FIG. 11.

Referring to FIG. 4A, a first bit 401 (for example, "1") is represented by a column of dark ink. A second bit 402 (for example, "0") is represented by a row of dark ink. It is appreciated that any color ink may be used to represent the various bits. The only requirement in the color of the ink chosen is that it provides a significant contrast with the background of the medium to be differentiable by an image capture system. The bits in FIG. 4A are represented by a 3×3 matrix of cells. The size of the matrix may be modified to be any size as based on the size and resolution of an image capture system. Alternative representation of bits 0 and 1 are shown in FIGS. 4C-4E. It is appreciated that the representation of a one or a zero for the sample encodings of FIGS. 4A-4E may be switched without effect. FIG. 4C shows bit representations occupying two rows or columns in an interleaved arrangement. FIG. 4D shows an alternative arrangement of the pixels in rows and columns in a dashed form. Finally FIG. 4E shows pixel representations in columns and rows in an irregular spacing format (e.g., two dark dots followed by a blank dot).

Referring back to FIG. 4A, if a bit is represented by a 3×3 matrix and an imaging system detects a dark row and two white rows in the 3×3 region, then a zero is detected (or one). If an image is detected with a dark column and two white columns, then a one is detected (or a zero).

Here, more than one pixel or dot is used to represent a bit. Using a single pixel (or bit) to represent a bit is fragile. Dust, creases in paper, non-planar surfaces, and the like create difficulties in reading single bit representations of data units. However, it is appreciated that different approaches may be used to graphically represent the array on a surface. Some approaches are shown in FIGS. 4C through 4E. It is appreciated that other approaches may be used as well. One approach is set forth in FIG. 11 using only space-shifted dots.

A bit stream is used to create the graphical pattern 403 of FIG. 4B. Graphical pattern 403 includes 12 rows and 18 columns. The rows and columns are formed by a bit stream that is converted into a graphical representation using bit representations 401 and 402. FIG. 4B may be viewed as having the following bit representation:

$$\begin{bmatrix} 0 & 1 & 0 & 1 & 0 & 1 & 1 & 1 & 0 \\ 1 & 1 & 0 & 1 & 1 & 0 & 0 & 1 & 0 \\ 0 & 0 & 1 & 0 & 1 & 0 & 0 & 1 & 1 \\ 1 & 0 & 1 & 1 & 0 & 1 & 1 & 0 & 0 \end{bmatrix}$$

Decoding

When a person writes with the pen of FIG. 2A or moves the pen close to the encoded pattern, the camera captures an image. For example, pen 201 may utilize a pressure sensor as pen 201 is pressed against paper and pen 201 traverses a document on the paper. The image is then processed to determine the orientation of the captured image with respect to the complete representation of the encoded image and extract the bits that make up the captured image.

For the determination of the orientation of the captured image relative to the whole encoded area, one may notice that not all the four conceivable corners shown in FIG. 5A-5D can present in the graphical pattern 403. In fact, with the correct orientation, the type of corner shown in FIG. 5A cannot exist in the graphical pattern 403. Therefore, the orientation in which the type of corner shown in FIG. 5A is missing is the right orientation.

Figures 6, 7:
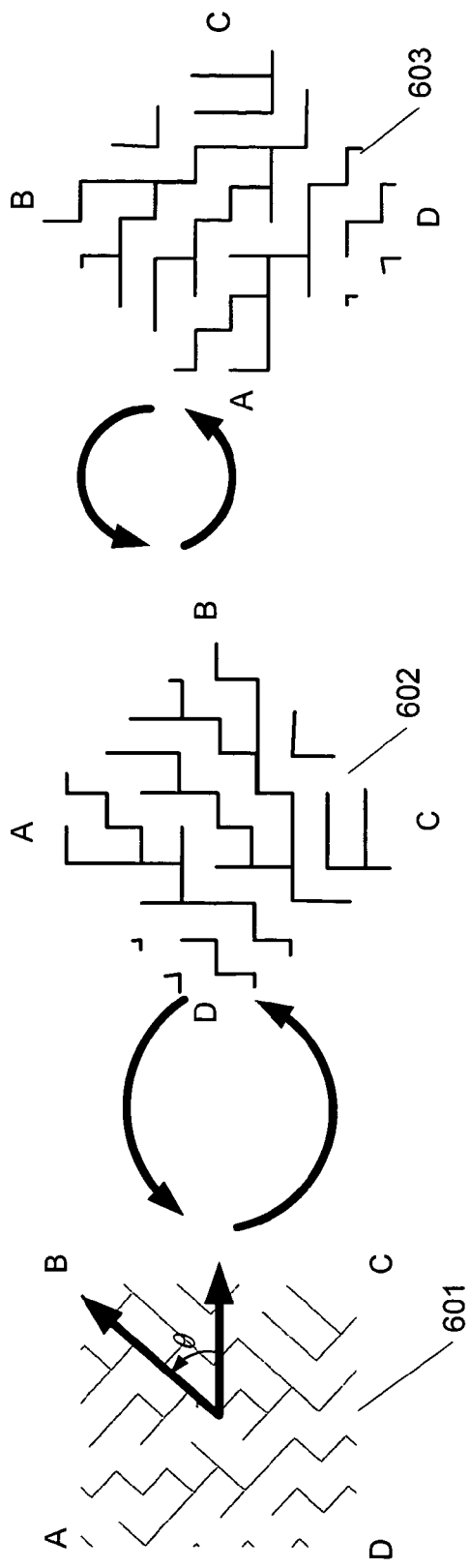
FIG. 6 shows rotation of a captured image portion in accordance with embodiments of the present invention.
FIG. 7 shows various angles of rotation used in conjunction with the coding system of FIGS. 4A through 4E.

Continuing to FIG. 6, the image captured by a camera 601 may be analyzed and its orientation determined so as to be interpretable as to the position actually represented by the image 601. First, image 601 is reviewed to determine the angle θ needed to rotate the image so that the pixels are horizontally and vertically aligned. It is noted that alternative grid alignments are possible including a rotation of the underlying grid to a non-horizontal and vertical arrangement (for example, 45 degrees). Using a non-horizontal and vertical arrangement may provide the probable benefit of eliminating visual distractions from the user, as users may tend to notice horizontal and vertical patterns before others. For purposes of simplicity, the orientation of the grid (horizontal and vertical and any other rotation of the underlying grid) is referred to collectively as the predefined grid orientation.

Next, image 601 is analyzed to determine which corner is missing. The rotation amount o needed to rotate image 601 to an image ready for decoding 603 is shown as o=(θ plus a rotation amount {defined by which corner missing}). The rotation amount is shown by the equation in FIG. 7. Referring back to FIG. 6, angle θ is first determined by the layout of the pixels to arrive at a horizontal and vertical (or other predefined grid orientation) arrangement of the pixels and the image is rotated as shown in 602. An analysis is then conducted to determine the missing corner and the image 602 rotated to the image 603 to set up the image for decoding. Here, the image is rotated 90 degrees counterclockwise so that image 603 has the correct orientation and can be used for decoding.

It is appreciated that the rotation angle θ may be applied before or after rotation of the image 601 to account for the missing corner. It is also appreciated that by considering noise in the captured image, all four types of corners may be present. We may count the number of corners of each type and choose the type that has the least number as the corner type that is missing.

Finally, the code in image 603 is read out and correlated with the original bit stream used to create image 403. The correlation may be performed in a number of ways. For example, it may be performed by a recursive approach in which a recovered bit stream is compared against all other bit stream fragments within the original bit stream. Second, a statistical analysis may be performed between the recovered bit stream and the original bit stream, for example, by using a Hamming distance between the two bit streams. It is appreciated that a variety of approaches may be used to determine the location of the recovered bit stream within the original bit stream.

As will be discussed, EIC pattern analysis obtains recovered bits from image 603. Once one has the recovered bits, one needs to locate the captured image within the original array (for example, the one shown in FIG. 4B). The process of determining the location of a segment of bits within the entire array is complicated by a number of items. First, the actual bits to be captured may be obscured (for example, the camera may capture an image with handwriting that obscures the original code). Second, dust, creases, reflections, and the like may also create errors in the captured image. These errors make the localization process more difficult. In this regard, the image capture system may need to function with non-sequential bits extracted from the image. The following represents a method for operating with non-sequential bits from the image.

Let the sequence (or m-sequence) I correspond to the power series $I(x)=1/P_n(x)$, where n is the order of the m-sequence, and the captured image contains K bits of I $b=(b_0\ b_1\ b_2\ \ldots\ b_{K-1})^t$, where $K \geq n$ and the superscript t represents a transpose of the matrix or vector. The location s of the K bits is just the number of cyclic shifts of I so that $b_0$ is shifted to the beginning of the sequence. Then this shifted sequence R corresponds to the power series $x^s/P_n(x)$, or $R=T^s(I)$, where T is the cyclic shift operator. We find this s indirectly. The polynomials modulo $P_n(x)$ form a field. It is guaranteed that $x^s \equiv r_0+r_1x+\ldots r_{n-1}x^{n-1} \mod(P_n(x))$. Therefore, we may find $(r_0, r_1, \ldots, r_{n-1})$ and then solve for s.

The relationship $x^s \equiv r_0+r_1x+\ldots r_{n-1} \mod(P_n(x))$ implies that $R=r_0+r_1T(I)+\ldots+r_{n-1}T^{n-1}(I)$. Written in a binary linear equation, it becomes:

$$R=r^tA \quad (2)$$

where $r=(r_0\ r_1\ r_2\ \ldots\ r_{n-1})^t$, and $A=(I\ T(I)\ \ldots\ T^{n-1}(I))^t$ which consists of the cyclic shifts of I from 0-shift to (n−1)-shift. Now only sparse K bits are available in R to solve r. Let the index differences between $b_1$ and $b_0$ in R be $k_i$, i=1,2,...,k−1, then the $1^{st}$ and $(k_i+1)$-th elements of R, i=1,2,...,k−1, are exactly $b_0, b_1, \ldots, b_{k-1}$. By selecting the $1^{st}$ and $(k_1+1)$-th columns of A, i=1,2,...,k−1, the following binary linear equation is formed:

$$b^t=r^tM \quad (3)$$

where M is an n×K sub-matrix of A.

If b is error-free, the solution of r may be expressed as:

$$r^t=\tilde{b}^t\tilde{M}^{-1} \quad (4)$$

where $\tilde{M}$ is any non-degenerate n×n sub-matrix of M and $\tilde{b}$ is the corresponding sub-vector of b.

With known r, we may use the Pohlig-Hellman-Silver algorithm as noted by Douglas W. Clark and Lih-Jyh Weng, "Maximal and Near-Maximal Shift Register Sequences: Efficient Event Counters and Easy Discrete Logorithms," IEEE Transactions on Computers 43.5 (May 1994, pp 560-568) to find s so that $x^s \equiv r_0+r_1x+\ldots r_{n-1}x^{n-1} \mod(P_n(x))$.

As matrix A (with the size of n by L, where $L=2^n-1$) may be huge, we should avoid storing the entire matrix A. In fact, as we have seen in the above process, given extracted bits with index difference $k_i$, only the first and $(k_i+1)$-th columns of A are relevant to the computation. Such choices of $k_i$ is quite limited, given the size of the captured image. Thus, only those columns that may be involved in computation need to saved. The total number of such columns is much smaller than L (where $L=2^n-1$ is the length of the m-sequence).

Error Correction

If errors exist in b, then the solution of r becomes more complex. Traditional methods of decoding with error correction may not readily apply, because the matrix M associated with the captured bits may change from one captured image to another.

We adopt a stochastic approach. Assuming that the number of error bits in b, $n_e$, is relatively small compared to K, then the probability of choosing correct n bits from the K bits of b and the corresponding sub-matrix $\tilde{M}$ of M being non-degenerate is high.

When the n bits chosen are all correct, the Hamming distance between $b^t$ and $r^tM$, or the number of error bits associated with r, should be minimal, where r is computed via equation (4). Repeating the process for several times, it is likely that the correct r that results in the minimal error bits can be identified.

If there is only one r that is associated with the minimum number of error bits, then it is regarded as the correct solution. Otherwise, if there is more than one r that is associated with the minimum number of error bits, the probability that $n_e$ exceeds the error correcting ability of the code generated by M is high and the decoding process fails. The system then may move on to process the next captured image. In another implementation, information about previous locations of the pen can be taken into consideration. That is, for each captured image, a destination area where the pen may be expected next can be identified. For example, if the user has not lifted the pen between two image captures by the camera, the location of the pen as determined by the second image capture should not be too far away from the first location. Each r that is associated with the minimum number of error bits can then be checked to see if the location s computed from r satisfies the local constraint, i.e., whether the location is within the destination area specified.

If the location s satisfies the local constraint, the X, Y positions of the extracted bits in the array are returned. If not, the decoding process fails.

Figure 8:
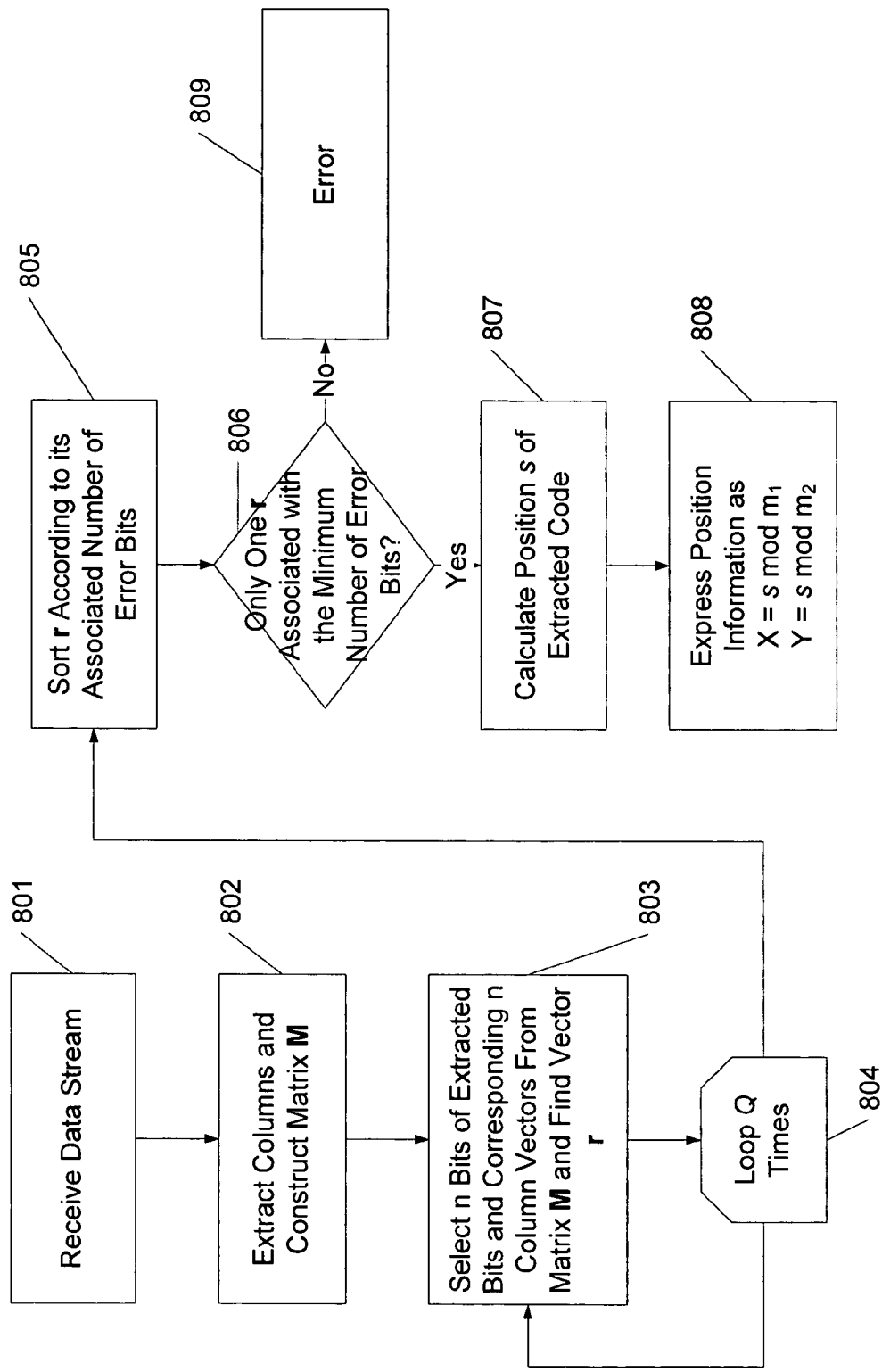
FIG. 8 shows a process for determining the location of a captured array in accordance with embodiments of the present invention.

FIG. 8 depicts a process that may be used to determine a location in a sequence (or m-sequence) of a captured image. First, in step 801, a data stream relating to a captured image is received. In step 802, corresponding columns are extracted from A and a matrix M is constructed.

In step 803, n independent column vectors are randomly selected from the matrix M and vector r is determined by solving equation (4). This process is performed Q times (for example, 100 times) in step 804. The determination of the number of loop times is discussed in the section Loop Times Calculation.

In step 805, r is sorted according to its associated number of error bits. The sorting can be done using a variety of sorting algorithms as known in the art. For example, a selection sorting algorithm may be used. The selection sorting algorithm is beneficial when the number Q is not large. However, if Q becomes large, other sorting algorithms (for example, a merge sort) that handle larger numbers of items more efficiently may be used.

The system then determines in step 806 whether error correction was performed successfully, by checking whether multiple r's are associated with the minimum number of error bits. If yes, an error is returned in step 809, indicating the decoding process failed. If not, the position s of the extracted bits in the sequence (or m-sequence) is calculated in step 807, for example, by using the Pohig-Hellman-Silver algorithm.

Next, the (X,Y) position in the array is calculated as: x=s mod $m_1$ and y=s mod $m_2$ and the results are returned in step 808.

Location Determination

Figure 9:
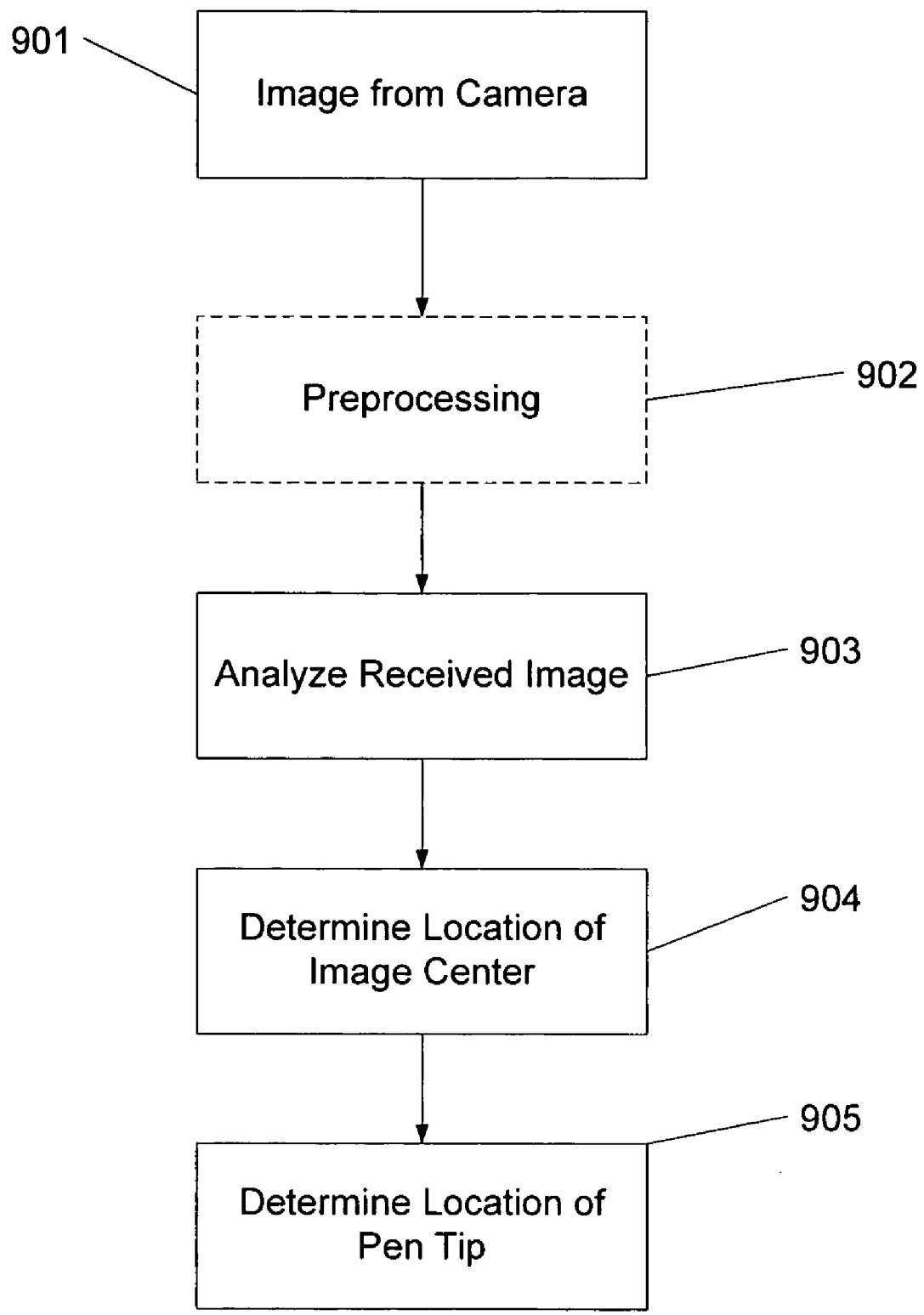
FIG. 9 shows a method for determining the location of a captured image in accordance with embodiments of the present invention.

FIG. 9 shows a process for determining the location of a pen tip. The input is an image captured by a camera and the output may be a position coordinates of the pen tip. Also, the output may include (or not) other information such as a rotation angle of the captured image.

In step 901, an image is received from a camera. Next, the received image may be optionally preprocessed in step 902 (as shown by the broken outline of step 902) to adjust the contrast between the light and dark pixels and the like.

Next, in step 903, the image is analyzed to determine the bit stream within it.

Next, in step 904, n bits are randomly selected from the bit stream for multiple times and the location of the received bit stream within the original sequence (or m-sequence) is determined.

Finally, once the location of the captured image is determined in step 904, the location of the pen tip may be determined in step 905.

Figure 10:
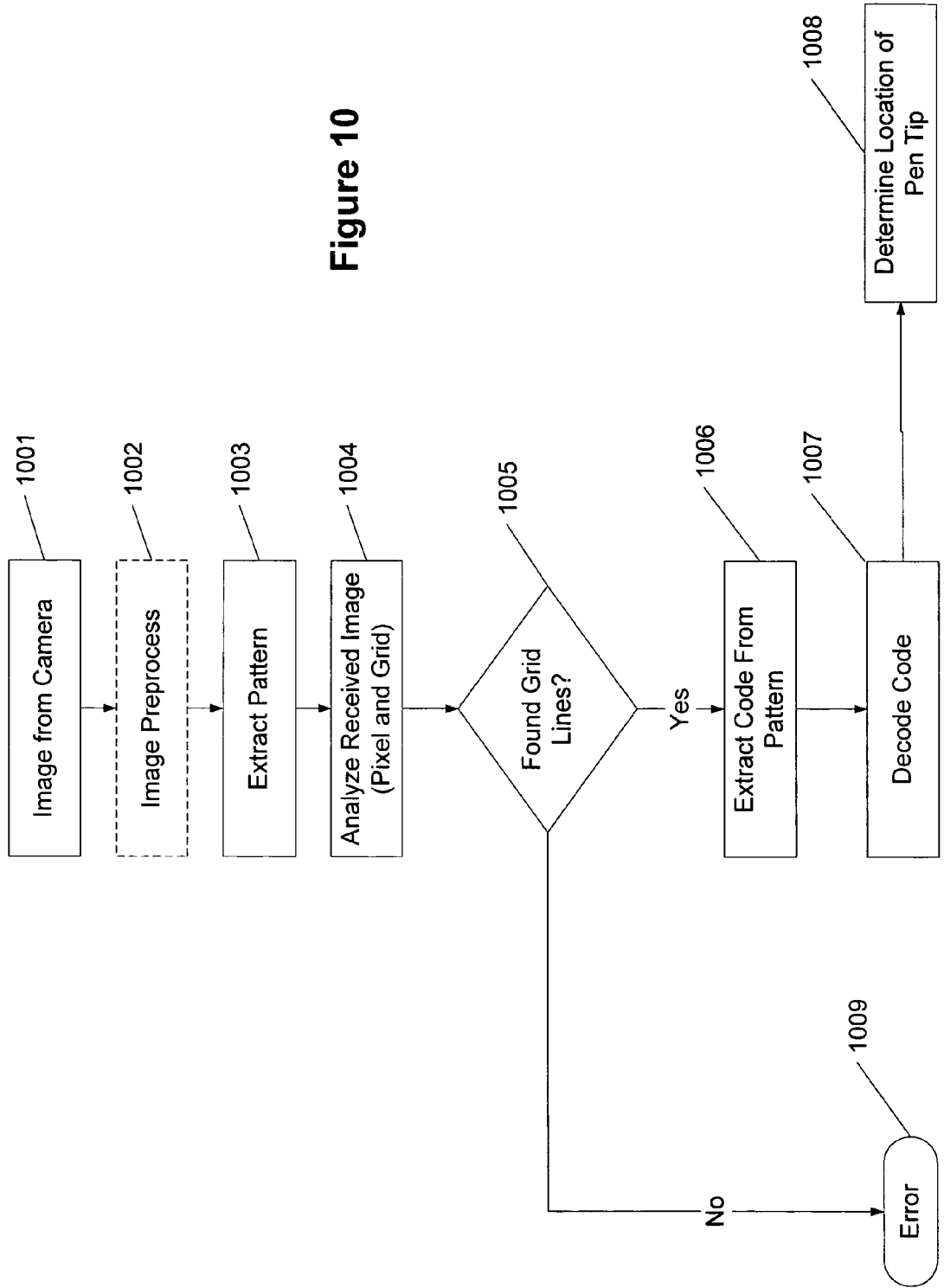
FIG. 10 shows another method for determining the location of captured image in accordance with embodiments of the present invention.

FIG. 10 gives more details about 903 and 904 and shows the approach to extract the bit stream within a captured image. First, an image is received from the camera in step 1001. The image then may optionally undergo image preprocessing in step 1002 (as shown by the broken outline of step 1002). The pattern is extracted in step 1003. Here, pixels on the various lines may be extracted to find the orientation of the pattern and the angle θ.

Next, the received image is analyzed in step 1004 to determine the underlying grid lines. If grid lines are found in step 1005, then the code is extracted from the pattern in step 1006. The code is then decoded in step 1007 and the location of the pen tip is determined in step 1008. If no grid lines were found in step 1005, then an error is returned in step 1009.

Outline of Enhanced Decoding and Error Correction Algorithm

Figure 12:
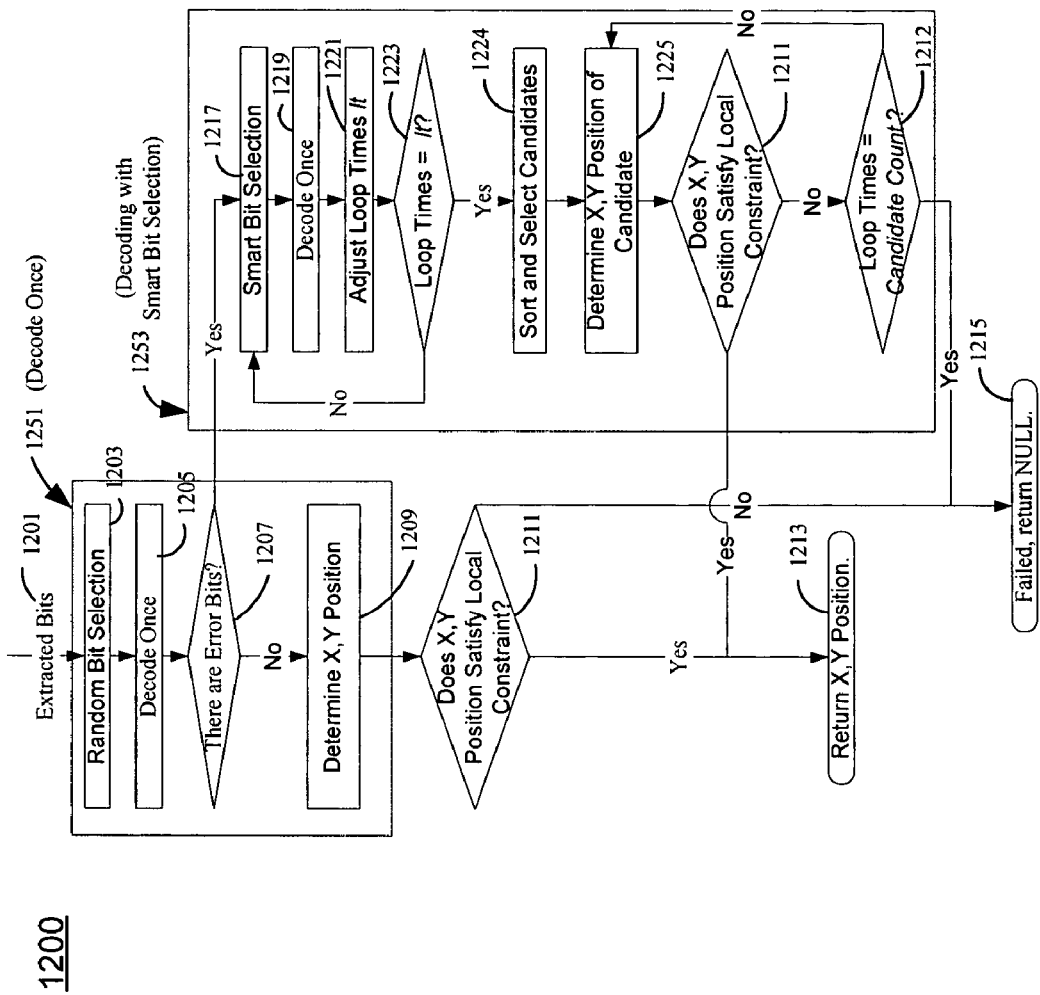
FIG. 12 shows a flow diagram for decoding extracted bits from a captured image in accordance with embodiments of the present invention.

With an embodiment of the invention as shown in FIG. 12, given extracted bits 1201 from a captured image (corresponding to a captured array) and the destination area, a variation of an m-array decoding and error correction process decodes the X,Y position. FIG. 12 shows a flow diagram of process 1200 of this enhanced approach. Process 1200 comprises two components 1251 and 1253.

Decode Once. Component 1251 includes three parts.
    random bit selection: randomly selects a subset of the extracted bits 1201 (step 1203)
    decode the subset (step 1205)
    determine X,Y position with local constraint (step 1209)
Decoding with Smart Bit Selection. Component 1253 includes four parts.
    smart bit selection: selects another subset of the extracted bits (step 1217)
    decode the subset (step 1219)
    adjust the number of iterations (loop times) of step 1217 and step 1219 (step 1221)
    determine X,Y position with local constraint (step 1225)

The embodiment of the invention utilizes a discreet strategy to select bits, adjusts the number of loop iterations, and determines the X,Y position (location coordinates) in accordance with a local constraint, which is provided to process 1200. With both components 1251 and 1253, steps 1205 and 1219 ("Decode Once") utilize equation (4) to compute r.

Let $\hat{b}$ be decoded bits, that is:

$$\hat{b}^t = r^t M \quad (5)$$

The difference between b and $\hat{b}$ are the error bits associated with r.

FIG. 12 shows a flow diagram of process 1200 for decoding extracted bits 1201 from a captured image in accordance with embodiments of the present invention. Process 1200 comprises components 1251 and 1253. Component 1251 obtains extracted bits 1201 (comprising K bits) associated with a captured image (corresponding to a captured array). In step 1203, n bits (where n is the order of the m-array) are randomly selected from extracted bits 1201. In step 1205, process 1200 decodes once and calculates r. In step 1207, process 1200 determines if error bits are detected for b. If step 1207 determines that there are no error bits, X,Y coordinates of the position of the captured array are determined in step 1209. With step 1211, if the X,Y coordinates satisfy the local constraint, i.e., coordinates that are within the destination area, process 1200 provides the X,Y position (such as to another process or user interface) in step 1213. Otherwise, step 1215 provides a failure indication.

If step 1207 detects error bits in b, component 1253 is executed in order to decode with error bits. Step 1217 selects another set of n bits (which differ by at least one bit from the n bits selected in step 1203) from extracted bits 1201. Steps 1221 and 1223 determine the number of iterations (loop times) that are necessary for decoding the extracted bits. Step 1225 determines the position of the captured array by testing which candidates obtained in step 1219 satisfy the local constraint. Steps 1217-1225 will be discussed in more details.

Smart Bit Selection

Step 1203 randomly selects n bits from extracted bits 1201 (having K bits), and solves for $r_1$. Using equation (5), decoded bits can be calculated. Let $I_1=\{k\in\{1,2,\ldots,K\}|b_k=\hat{b}_k\}$, $\bar{I}_1=\{k\in\{1,2,\ldots,K\}|b_k\neq\hat{b}_k\}$, where $\hat{b}_k$ is the $k^{th}$ bit of $\hat{b}$, $B_1=\{b_k|k\in I_1\}$ and $\bar{B}_1=\{b_k|k\in\bar{I}_1\}$, that is, $B_1$ are bits that the decoded results are the same as the original bits, and $\bar{B}_1$ are bits that the decoded results are different from the original bits, $I_1$ and $\bar{I}_1$ are the corresponding indices of these bits. It is appreciated that the same $r_1$ will be obtained when any n independent bits are selected from $B_1$. Therefore, if the next n bits are not carefully chosen, it is possible that the selected bits are a subset of $B_1$, thus resulting in the same $r_1$ being obtained.

Figure 13:
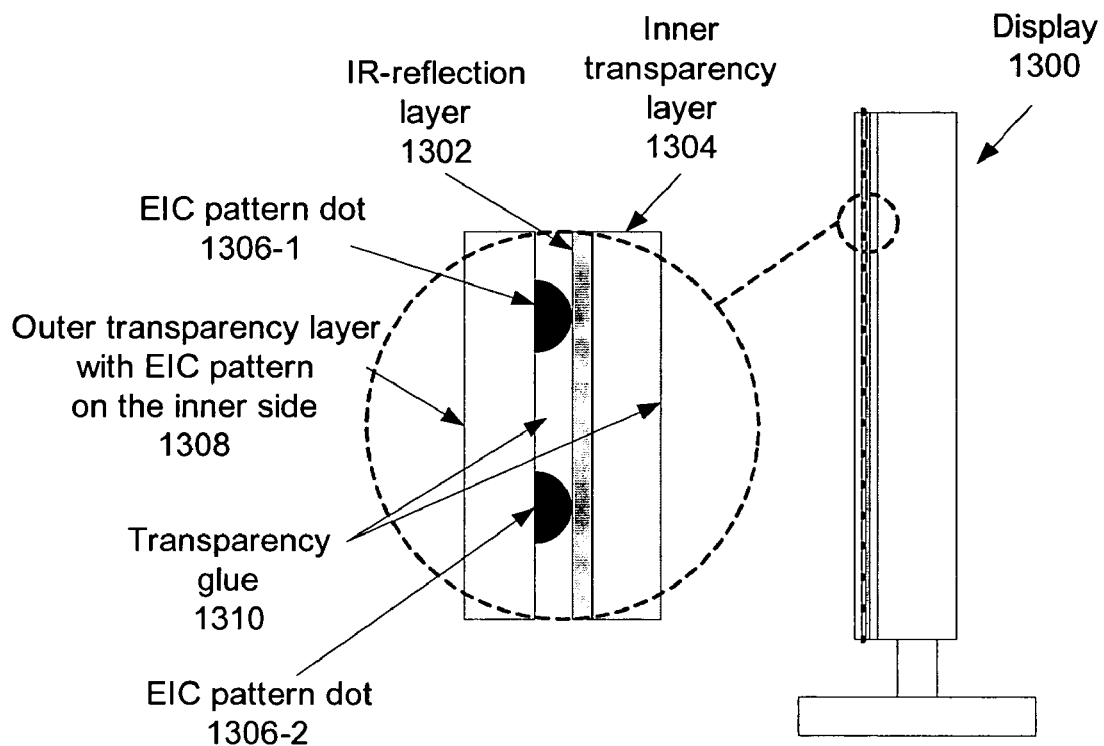
FIG. 13 shows an embedded interaction code-enabled display in accordance with embodiments of the invention.
Figure 14:
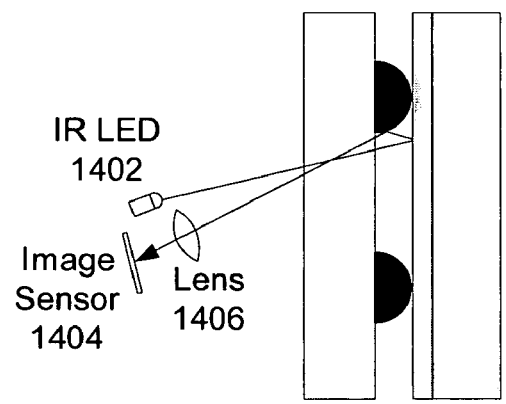
FIG. 14 shows how an infrared-reflection layer may improve the quality of images captured from an embedded interaction code-enabled display.

In order to avoid such a situation, step 1217 selects the next n bits according to the following procedure:

Choose at least one bit from $\bar{B}_1$ 1303 and the rest of the bits randomly from $B_1$ 1301 and $\bar{B}_1$ 1303, as shown in FIG. 13 corresponding to bit arrangement 1351. Process 1200 then solves $r_2$ and finds $B_2$ 1305, 1309 and $\bar{B}_2$ 1307, 1311 by computing $\hat{b}_2{}^t=r_2{}^tM_2$. Repeat step 1. When selecting the next n bits, for every $\bar{B}_i$ (i=1, 2, 3 ..., x−1, where x is the current loop number), there is at least one bit selected from $\bar{B}_i$. The iteration terminates when no such subset of bits can be selected or when the loop times are reached.

Loop Times Calculation

With the error correction component 1253, the number of required iterations (loop times) is adjusted after each loop. The loop times is determined by the expected error rate. The expected error rate $p_e$ in which not all the selected n bits are correct is:

$$p_e = \left(1 - \frac{C^n_{K-n_e}}{C^n_K}\right)^{lt} \approx -e^{-lt\left(\frac{K-n}{K}\right)^{n_e}} \quad (6)$$

where lt represents the loop times and is initialized by a constant, K is the number of extracted bits from the captured array, $n_e$ represents the minimum number of error bits incurred during the iteration of process 1200, n is the order of the m-array, and $C_K^n$ is the number of combinations in which n bits are selected from K bits.

In the embodiment, we want $p_e$ to be less than $e^{-5}=0.0067$. In combination with (6), we have:

$$lt_i = \min\left(lt_{i-1}, \frac{5}{\left(\frac{K-n}{K}\right)^{n_e}} + 1\right) \quad (7)$$

Adjusting the loop times may significantly reduce the number of iterations of process 1253 that are required for error correction.

Determine X, Y Position with Local Constraint

In steps 1209 and 1225, the decoded position should be within the destination area. The destination area is an input to the algorithm, and it may be of various sizes and places or simply the whole m-array depending on different applications. Usually it can be predicted by the application. For example, if the previous position is determined, considering the writing speed, the destination area of the current pen tip should be close to the previous position. However, if the pen is lifted, then its next position can be anywhere. Therefore, in this case, the destination area should be the whole m-array. The correct X,Y position is determined by the following steps.

In step 1224 process 1200 selects $r_i$ whose corresponding number of error bits is less than:

$$N_e = \frac{\log_{10}\left(\frac{3}{lt}\right)}{\log_{10}\left(\frac{K-n}{K}\right) \times \log_{10}\left(\frac{10}{lr}\right)} \quad (8)$$

where lt is the actual loop times and lr represents the Local Constraint Rate calculated by:

$$lr = \frac{\text{area of the destination area}}{L} \quad (9)$$

where L is the length of the m-array.

Step 1224 sorts $r_i$ in ascending order of the number of error bits. Steps 1225, 1211 and 1212 then finds the first $r_i$ in which the corresponding X,Y position is within the destination area. Steps 1225, 1211 and 1212 finally returns the X,Y position as the result (through step 1213), or an indication that the decoding procedure failed (through step 1215).

Illustrative Example of Enhanced Decoding and Error Correction Process

An illustrative example demonstrates process 1200 as performed by components 1251 and 1253. Suppose n=3, K=5, $I=(I_0\ I_1\ \ldots\ I_6)^t$ is the m-sequence of order n=3. Then $$A = \begin{pmatrix} I_0 & I_1 & I_2 & I_3 & I_4 & I_5 & I_6 \\ I_6 & I_0 & I_1 & I_2 & I_3 & I_4 & I_5 \\ I_5 & I_6 & I_0 & I_1 & I_2 & I_3 & I_4 \end{pmatrix} \quad (10)$$

Also suppose that the extracted bits $b=(b_0\ b_1\ b_2\ b_3\ b_4)^t$, where K=5, are actually the $s^{th}$, $(s+1)^{th}$, $(s+3)^{th}$, $(s+4)^{th}$, and $(s+6)^{th}$ bits of the m-sequence (these numbers are actually modulus of the m-array length $L=2^n-1=2^3-1=7$). Therefore $$M = \begin{pmatrix} I_0 & I_1 & I_3 & I_4 & I_6 \\ I_6 & I_0 & I_2 & I_3 & I_5 \\ I_5 & I_6 & I_1 & I_2 & I_4 \end{pmatrix} \quad (11)$$

which consists of the $0^{th}$, $1^{st}$, $3^{rd}$, $4^{th}$, and $6^{th}$ columns of A. The number s, which uniquely determines the X,Y position of $b_0$ in the m-array, can be computed after solving $r=(r_0\ r_1\ r_2)^t$ that are expected to fulfill $b^t=r^tM$. Due to possible error bits in b, $b^t=r^tM$ may not be completely fulfilled.

Process 1200 utilizes the following procedure. Randomly select n=3 bits, say $\hat{b}_1{}^t=(b_0\ b_1\ b_2)$, from b. Solving for $r_1$:

$$\hat{b}_1{}^t = r_1{}^t\tilde{M}_1 \quad (12)$$

where $\tilde{M}_1$ consists of the 0th, 1st, and 2nd columns of M. (Note that $\tilde{M}_1$ is an n×n matrix and $r_1{}^t$ is a 1×n vector so that $\hat{b}_1{}^t$ is a 1×n vector of selected bits.)

Next, decoded bits are computed:

$$\hat{b}_1{}^t = r_1{}^tM \quad (13)$$

where M is an n×K matrix and $r_1{}^t$ is a 1×n vector so that $\hat{b}_1{}^t$ is a 1×K vector. If $\hat{b}_1$ is identical to b, i.e., no error bits are detected, then step 1209 determines the X,Y position and step 1211 determines whether the decoded position is inside the destination area. If so, the decoding is successful, and step 1213 is performed. Otherwise, the decoding fails as indicated by step 1215. If $\hat{b}_1$ is different from b, then error bits in b are detected and component 1253 is performed. Step 1217 determines the set $B_1$, say $\{b_0 b_1 b_2 b_3\}$, where the decoded bits are the same as the original bits. Thus, $\overline{B}_1 = \{b_4\}$ (corresponding to bit arrangement 1351 in FIG. 13). Loop times (lt) is initialized to a constant, e.g., 100, which may be variable depending on the application. Note that the number of error bits corresponding to $r_1$ is equal to 1. Then step 1221 updates the loop time (lt) according to equation (7), $lt_1 = \min(lt, 13) = 13$.

Step 1217 next chooses another n=3 bits from b. If the bits all belong to $B_1$, say $\{b_0 b_2 b_3\}$, then step 1219 will determine $r_1$ again. In order to avoid such repetition, step 1217 may select, for example, one bit $\{b_4\}$ from $\overline{B}_1$, and the remaining two bits $\{b_0 b_1\}$ from $B_1$.

The selected three bits form $\hat{b}_2{}' = (b_0\ b_1\ b_4)$. Step 1219 solves for $r_2$:

$$\hat{b}_2{}' = r_2{}^t \tilde{M}_2 \qquad (14)$$

where $\tilde{M}_2$ consists of the $0^{th}$, $1^{st}$, and $4^{th}$ columns of M.

Step 1219 computes $\hat{b}_2{}' = r_2{}^1 M$. Find the set $B_2$, e.g., $\{b_0\ b_1\ b_4\}$, such that $\hat{b}_2$ and b are the same. Then $\overline{B}_2 = \{b_2\ b_3\}$ (corresponding to bit arrangement 1353 in FIG. 13). Step 1221 updates the loop times (lt) according to equation (7). Note that the number of error bits associated with $r_2$ is equal to 2. Substituting into (7), $lt_2 = \min(lt_1, 32) = 13$.

Because another iteration needs to be performed, step 1217 chooses another n=3 bits from b. The selected bits shall not all belong to either $B_1$ or $B_2$. So step 1217 may select, for example, one bit $\{b_4\}$ from $\overline{B}_1$, one bit $\{b_2\}$ from $\overline{B}_2$, and the remaining one bit $\{b_0\}$.

The solution of r, bit selection, and loop times adjustment continues until we cannot select any new n=3 bits such that they do not all belong to any previous $B_1$'s, or the maximum loop times lt is reached.

Suppose that process 1200 calculates five $r_i$ (i=1,2,3,4,5), with the number of error bits corresponding to 1, 2, 4, 3, 2, respectively. (Actually, for this example, the number of error bits cannot exceed 2, but the illustrative example shows a larger number of error bits to illustrate the algorithm.) Step 1224 selects $r_i$'s, for example, $r_1, r_2, r_4, r_5$, whose corresponding numbers of error bits are less than $N_e$ shown in (8).

Step 1224 sorts the selected vectors $r_1, r_2, r_4, r_5$, in ascending order of their error bit numbers: $r_1, r_2, r_5, r_4$. From the sorted candidate list, steps 1225, 1211 and 1212 find the first vector r, for example, $r_5$, whose corresponding position is within the destination area. Step 1213 then outputs the corresponding position. If none of the positions is within the destination area, the decoding process fails as indicated by step 1215.

Embedded Interaction Code Enabled Display

Embedded Interaction Code (EIC) technology refers to a kind of data embedding and encoding technology that enables embedding both x-y position data and metadata to various surfaces, including, but not limited to, paper, a whiteboard, a display screen, and the like. A display screen may be a liquid crystal display (LCD), an organic light-emitting device (OLED), a plasma display, a flat panel display, or the like.

LCD is a display technology that uses rod-shaped molecules (liquid crystals) that flow like liquid and bend light. Unenergized, the crystals direct light through two polarizing filters, allowing a natural background color to show. When energized, they redirect the light to be absorbed in one of the polarizers, causing the dark appearance of crossed polarizers to show.

An OLED is (also referred to as an Organic Light Emitting Diode) is a thin-film, light-emitting device that typically consists of a series of organic layers between two electrical contacts (electrodes). OLEDs can be made using small-molecular weight organic materials or polymer-based materials. Unlike LCDs and field emission displays, which are constructed of layered materials, OLEDs are monolithic devices, because each layer is deposited on the other, creating a single unit.

Plasma display (also called "gas discharge display") is a flat-screen technology that uses small cells lined with phosphor that are full of inert ionized gas (typically a mix of xenon and neon). Three cells make up one pixel (one cell has red phosphor, one green, one blue). The cells are sandwiched between x- and y-axis panels, and a cell is selected by charging the appropriate x and y electrodes. The charge causes the gas in the cell to emit ultraviolet light, which causes the phosphor to emit color. The amount of charge determines the intensity, and the combination of the different intensities of red, green, and blue produce all the colors required.

A flat panel display is a relatively thin display screen typically used in portable computers. Nearly all modern flat-panel displays use LCD technology. Most LCD screens are backlit to make them easier to read in bright environments.

Embedded-Interaction-Code (EIC) information may be embedded within a display surface so that a user of a camera-based computing device, such as a digital pen, may interact with a document displayed on the display surface.

Various techniques may be used to embed an EIC pattern into a particular display surface. In an implementation of the invention, we have come up with several relatively low-cost approaches to embed an EIC pattern into display surfaces such as a relatively large plasma display, an LCD screen, a white board, and media such as CAD drawings (e.g., EIC pattern inserted into electronic CAD drawing as a distinct layer), screen protection film, and watermarked screen images. A single camera-equipped digital pen can work on both printed documents and different types of display surfaces without a user having to manually switch digital-pen modes to account for the different types of display surfaces (i.e., printed document versus various types of display surfaces), thereby providing an enhanced and more consistent user experience.

EIC Pattern Carrier Structure

FIG. 13 shows a structure of an EIC pattern carrier for a display 1300 in accordance with embodiments of the invention. As shown in FIG. 13, the EIC pattern carrier contains an outer transparency layer 1308 with an EIC dot pattern 1306 (made up of EIC pattern dots, including, but not limited to, EIC pattern dots 1306-1 and 1306-2) on the inner side of the outer transparency layer 1308, an infrared-reflection layer 1302, and an inner transparency layer 1304. The outer transparency layer 1308 may be film, plastic, glass, or the like. The pattern may be printed or pressed to the inner side of the outer transparency layer 1308. An infrared-reflection tectorial (i.e., overlying surface) layer 1302 is on the outer side of the inner transparency layer 1304. The inner transparency layer 1304 may also be film, plastic, glass, or the like. Transparency glue 1310 may be used between the outer transparency layer 1308 and the infrared-reflection layer 1302 and on the inner side of the inner transparency layer 1304, as shown in FIG. 13.

The infrared-reflection layer 1304 is optional. The infrared-reflection layer 1304 may increase the quality of images captured from the display surface. As FIG. 214 shows, light reflected by the infrared-reflection layer 1304 may also be reflected by EIC pattern dots 1306 thereby increasing the amount of light from the infrared light-emitting diode ("IR LED") 1402 that gets reflected back through the lens 1406 to the image sensor 1404.

The inner transparency layer 1304 is optional. The dual transparency layer structure may increase the quality of images captured from the display surface for reasons similar to those discussed above regarding the infrared-reflection layer 1304.

Figure 15:
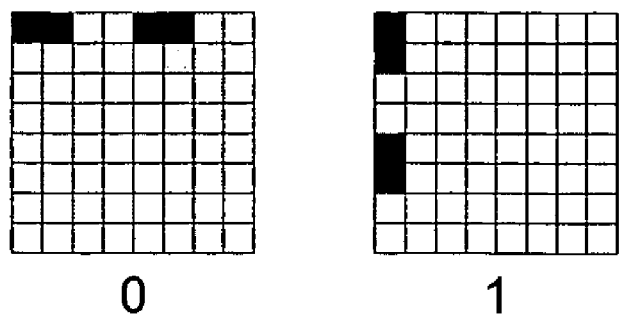
FIG. 15 shows a bit representation of EIC symbols for representing one bit on an embedded interaction code-enabled display in accordance with embodiments of the invention.

Display manufacturers may integrate an EIC Pattern carrier into various types of displays. For instance, FIG. 15 shows a bit representation of EIC symbols for representing one bit on a flat panel display in accordance with embodiments of the invention. The EIC symbol size for the flat panel display is 8 dots of 600 DPI.

In one implementation of the invention, an EIC Array address space is 30 bits, of which 28 bits are allocated for identifying a particular display and 2 bits are allocated for the surface identifier, which is discussed in more detail below.

In accordance with an embodiment of the invention, an EIC Array may be implemented with a relatively large address space, such as 240 bits, which enables display manufacturers to release each new display with a unique surface identifier. As will be apparent, EIC Array address space sizes other than those discussed above may also be implemented.

Surface-ID Encoding

Figure 17:
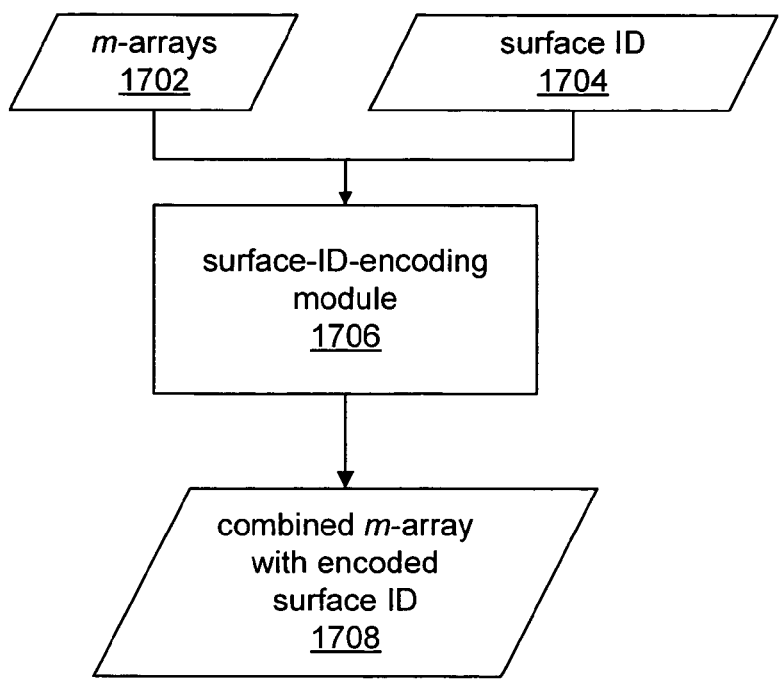
FIG. 17 shows a flow diagram of a system for encoding a surface identifier in accordance with embodiments of the invention.

FIG. 17 shows a flow diagram of a system for encoding a surface identifier in accordance with embodiments of the invention. One or more m-arrays, as depicted by m-arrays 1702, and a surface identifier 1704 are input to a surface-ID-encoding module 1706, which outputs a combined array with encoded surface identifier 1708. The one or more input m-arrays may be m-arrays such as position m-array 1902 and surface identifier m-array 1904, which are both depicted in FIG. 19.

A surface identifier in a particular region of a display surface may be encoded using the same m-array as the m-array that represents X, Y position information. The surface-ID m-array may be shifted, however, according to the value of the surface identifier.

Figure 19:
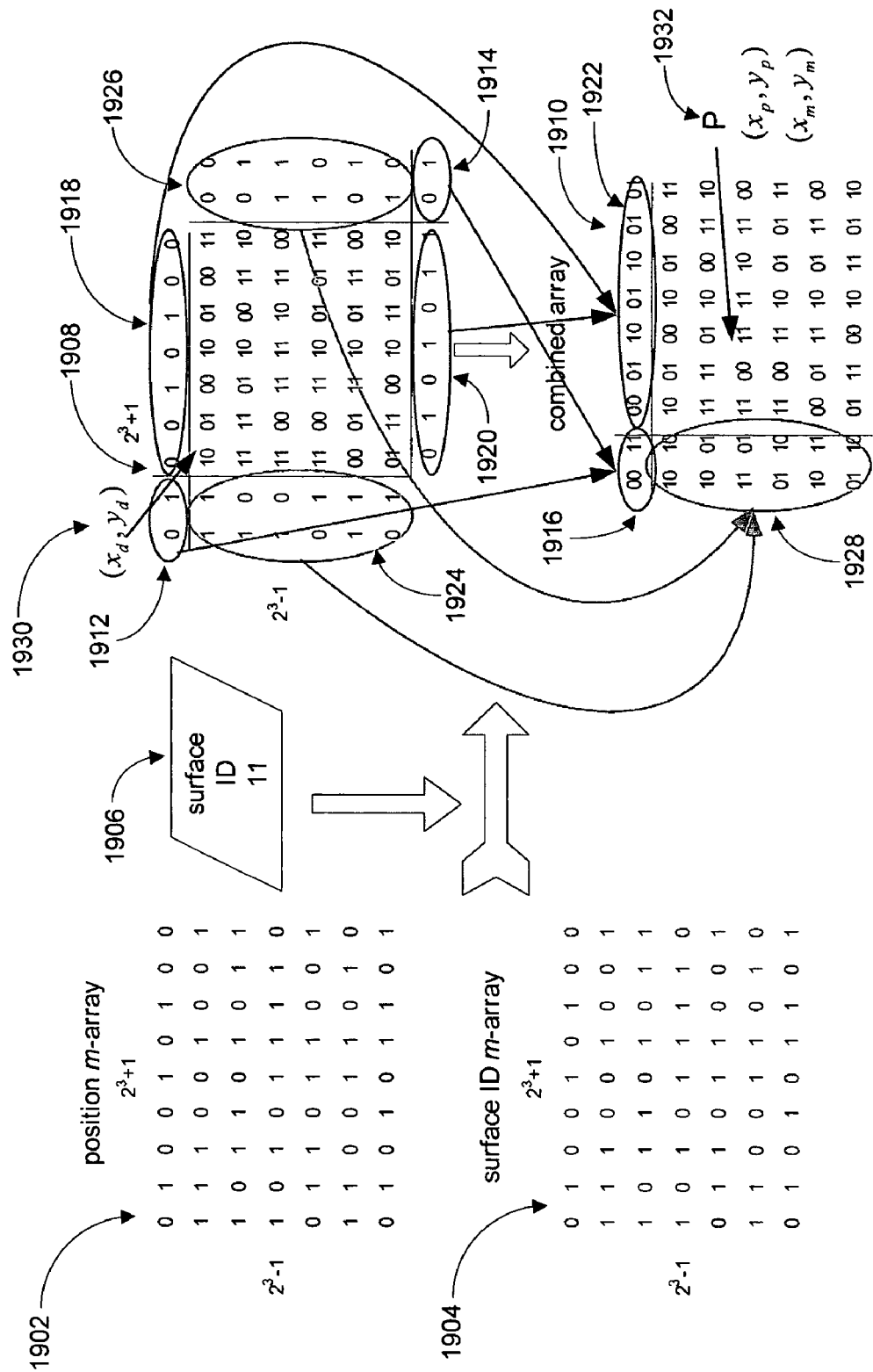
FIG. 19 shows a surface-identifier-encoding example in accordance with embodiments of the invention.

FIG. 19 shows a surface-ID-encoding example in accordance with embodiments of the invention. Two identical m-arrays, a position m-array 1902 and a surface-ID m-array 1904, are shown on the left side of FIG. 19. Both m-arrays are order 6 m-arrays. Therefore, the width of each m-array is $2^3+1$, and the height of each m-array is $2^3-1$.

The position m-array and the surface-ID m-array may contain repeating bit sequences that are the same length but that have different bit sequences relative to each other. Stated differently, different primitive polynomials of order n may be used to generate different m-arrays, which will then contain different repeating bit sequences.

Figure 20:
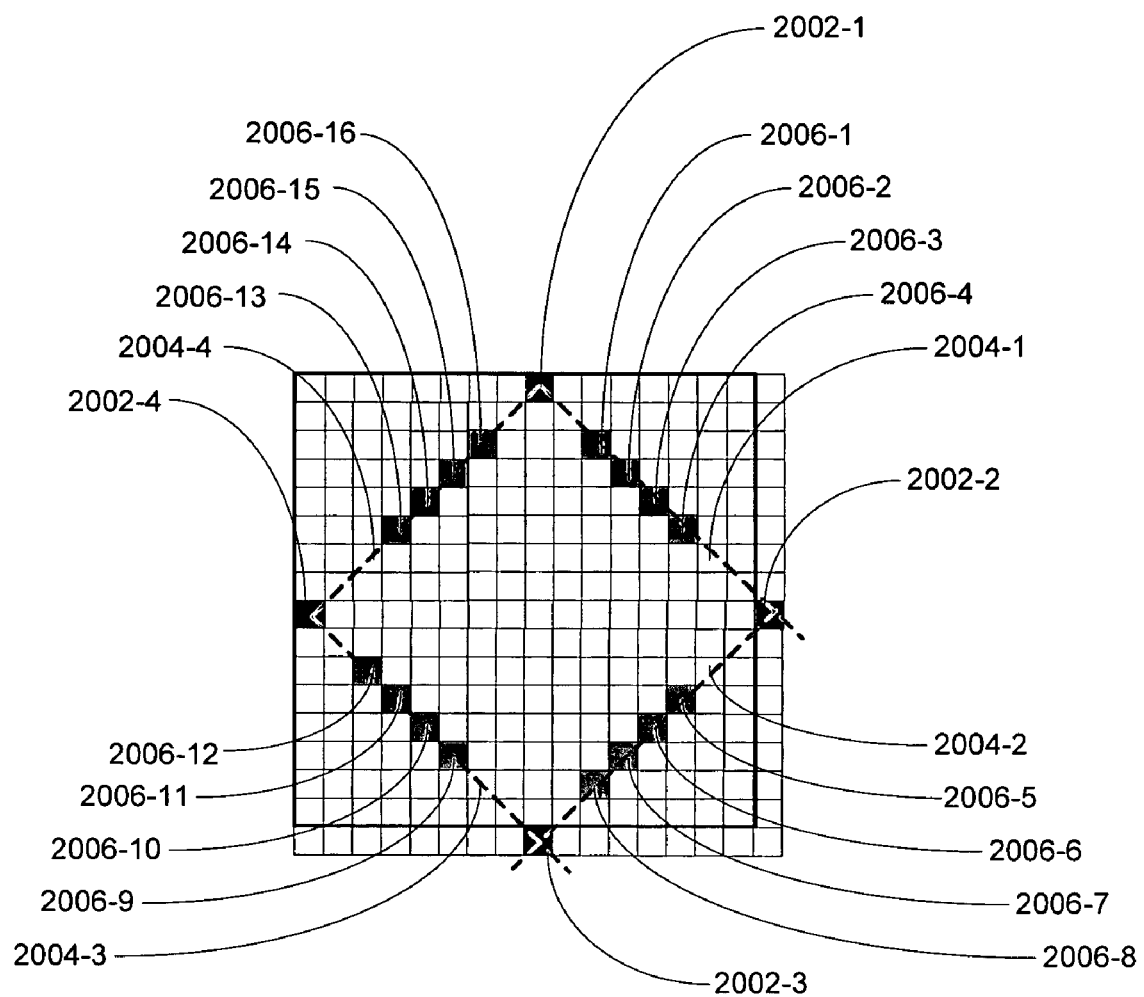
FIG. 20 shows an example of an EIC symbol in accordance with embodiments of the invention.

The two m-arrays may be combined, in accordance with embodiments of the invention, to encode two bits in one EIC symbol. An example of an EIC symbol is depicted in FIG. 20. The EIC symbol in FIG. 20 occupies all of the rows and columns of grid spaces shown in FIG. 20 except for the bottom row and the right-most column. That row and that column belong to adjacent EIC symbols. Accordingly, while black dots 2002-1 and 2002-4 belong to the EIC symbol shown in FIG. 20, black dots 2002-2 and 2002-3 are not part of that EIC symbol. Data dots 2006-1 through 2006-16 may be black or white for representing bits of information. Orientation dots 2004-1 through 2004-4 are always white to facilitate properly orienting camera-captured EIC-symbol images.

When the position m-array 1902 and the surface-ID m-array 1404 are combined, based on the value of the surface identifier (e.g., 11), the start of the surface-ID m-array 1904 is shifted to position ($x_d, y_d$), as depicted at 1930 in FIG. 19, of the position m-array 1902. The x,y coordinates may be calculated as follows:

$$x_d = \text{mod}\left(\text{surface } ID, 2^{\frac{n}{2}}+1\right),$$

$$y_d = \text{int}\left(\frac{\text{surface } ID}{2^{\frac{n}{2}}+1}\right),$$

where n is the order of the m-array and $0 \leq$ surface ID $\leq 2^n - 2$.

In FIG. 19, the value of the surface identifier 1906 being encoded is 11 and the order of the m-arrays is 6 (i.e., n=6). Therefore, $$x_d = \text{mod}\left(11, 2^{\frac{6}{2}}+1\right) = 2,$$

$$y_d = \text{int}\left(\frac{11}{2^{\frac{6}{2}}+1}\right).$$

As shown in the partially combined m-array 1908, the surface identifier m-array 1904 starts at position (2,1) of the position m-array 1902. Since the position m-array 1902 and the surface identifier m-array 1904 repeat themselves, a combined m-array with encoded surface identifier 1910, which is shown in the lower right corner of FIG. 19, may be generated. As a result of starting the surface-ID m-array 1904 at (2,1), portions 1920, 1914, and 1926 of the surface-ID m-array 1904 are left over after combining the overlapping rows and columns of the position m-array 1902 and the surface-ID m-array 1904. Portion 1926 of the surface-ID m-array 1904 and portion 1924 of the position m-array 1902 are combined in the combined array 1910, as depicted at 1928. Similarly, portion 1914 of the surface identifier m-array 1904 and portion 1912 of the position m-array 1902 are combined in the combined array 1910 as depicted at 1916. And portion 1920 of the surface-ID m-array 1904 and portion 1918 of the position m-array 1902 are combined in the combined array 1910 as depicted at 1922.

The value of the surface identifier is the distance in the combined array between the position m-array 1902 and the surface-ID m-array 1904. The distance is kept the same in every pair of bits in the combined array 1910. Therefore, if the position of each bit in its corresponding m-array is obtained, the distance in the combined array 1910 can be determined.

Surface-ID Decoding

Figure 18:
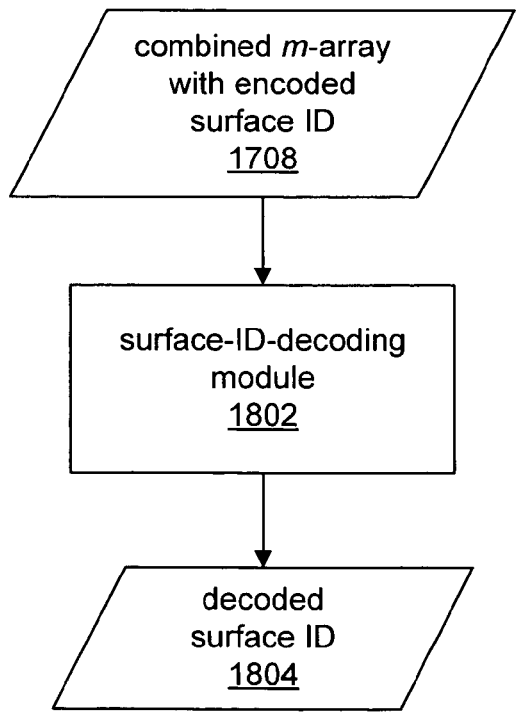
FIG. 18 shows a flow diagram of a system for decoding a surface identifier in accordance with embodiments of the invention.

FIG. 18 shows a flow diagram of a system for decoding an encoded surface identifier in accordance with embodiments of the invention. A combined array with encoded surface identifier 1708 is input to a surface-ID-decoding module 1802, which outputs a decoded surface identifier 1804.

To decode an encoded surface identifier, the m-arrays that have been combined to form the combined array 1708 are each separately decoded. For example, referring to the example shown in FIG. 19, the position m-array 1902 and the surface-ID m-array 1904 are separately decoded. Then, for a particular point P 1932, two positions are obtained: ($x_p, y_p$), the position of the point in the position m-array 1902, and ($x_m, y_m$), the position of the point in the surface-ID m-array 1904.

The value of the surface identifier may then be calculated as follows:

$$\text{surface } ID = \text{mod}(y_p - y_m, 2^{\frac{n}{2}} - 1) \cdot (2^{\frac{n}{2}} + 1) + \text{mod}(x_p - x_m, 2^{\frac{n}{2}} + 1),$$

where n is the order of the combined m-array 1708.

In the example shown in FIG. 19, the position of P in the first m-array is (4,3). The position of P in the second m-array is (2,2). Therefore, the value of the surface identifier is:

surface ID=mod(3−2,2³−1)·(2³+1)+mod(4−2,2³+1)
=11.

For real-world applications, there may be multi-dimensional surface-identifier information. For example, suppose there is 1 position dimension and there are 7 dimensions for the surface identifier. Then the overall surface identifier may be calculated as follows.

After decoding for each dimension, position $(x_p, y_p)$ is the output of the dimension representing X, Y position and $(x_m^i, y_m^i)$ are the output of the remaining 7 surface-ID dimensions, where i=0, 1, 2, ..., 6. Therefore, surface-identifier information encoded in each dimension can be obtained:

$$\text{surface } ID \text{ portion}_i = \\ \text{mod}(y_p - y_m^i, 2^{\frac{n}{2}} - 1) \cdot (2^{\frac{n}{2}} + 1) + \text{mod}(x_p - x_m^i, 2^{\frac{n}{2}} + 1),$$

where n is the order of the m-array.

For dimension i, where i=0, 1, 2, ..., 6, a value of surface ID portion, is obtained from each image successfully decoded for that dimension. For all images, the value that occurs most often may be considered the value of that portion of the surface identifier.

Now that the surface identifier encoded in each of the 7 dimensions representing a surface identifier is obtained, the surface identifier may be calculated as:

$$\text{surface } ID = \sum_{i=0}^{6} \text{surface } ID \text{ portion}_i \cdot (2^n - 1)^i,$$

where n is the order of the m-array. As will be apparent, any suitable number of dimensions may be used for embedding surface-ID information.

Embedding surface-ID information in multiple dimensions allows surprisingly large surface-ID values to be encoded. For instance, suppose there are 8 dimensions available, one dimension is used for X,Y position data and 7 dimensions are used for surface-ID information. For the 7 dimensions of surface-ID information, suppose that an order 28 m-array is used (i.e., the m-array will have $2^{14}+1$ columns and $2^{14}-1$ rows). Then the number of possible values of surface-ID information that can be encoded in seven dimensions is $(2^{28}-2)^7$.

Figure 16:
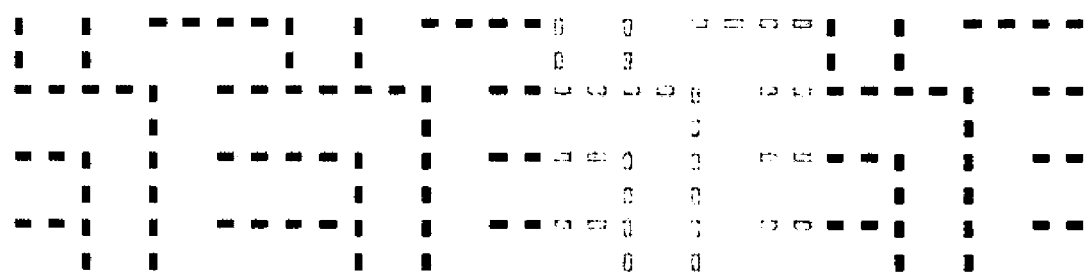
FIG. 16 shows a portion of an EIC pattern in four different colors: cyan, magenta, yellow and black.

FIG. 16 shows a portion of an EIC pattern in four different colors: cyan, magenta, yellow and black. These are mainstream colors in the printing and pressing industry. As will be apparent, though, other colors may also be used. When printing or pressing a cyan, magenta, or yellow EIC pattern on transparency material, a camera-equipped computing device will typically capture a better image than if the EIC pattern is black. For human users, a yellow EIC Pattern is less visible (and therefore less of a distraction) than a cyan or a magenta EIC Pattern.

An EIC pattern may be printed onto an EIC pattern film to enable a user to interact (including making annotating with a digital pen) with a document being displayed by a display via a camera-equipped computing device. In accordance with various embodiments of the invention, an EIC Pattern may be printed on a transparency film by either a monochrome or color printer. Further, the printer may be either a laser printer or an inkjet printer. Research results indicate that the following combinations produce suitable results, which are ranked in descending order of performance: yellow color laser printer, magenta color laser printer, cyan color laser printer, yellow color inkjet printer, magenta color inkjet printer, cyan color inkjet printer, monochrome laser printer, and monochrome inkjet printer.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. An embedded interaction code-enabled display comprising:

an outer transparency layer;

an inner transparency layer; and an embedded interaction code dot pattern between the outer transparency layer and the inner transparency layer, wherein the embedded interaction code dot pattern is generated at least in part by combining a first m-array and a second m-array, wherein the second m-array is generated by shifting an identical copy of the first m-array in a first dimension and a second dimension based on a surface identifier that identifies the embedded interaction code-enabled display and wherein position data and the surface identifier are encoded in the embedded interaction code dot pattern so that when a portion of the embedded interaction code pattern is captured, the surface identifier and the position of the captured portion relative to the entire embedded interaction code pattern can be determined wherein generating the second m-array includes shifting the identical copy of the first m-array in a first dimension by $$\text{mod}(\text{surface } ID, 2^{\frac{n}{2}} + 1)$$

units, wherein surface ID is the surface identifier and n is the order of the first m-array and wherein generating the second m-array includes shifting the identical copy of the first m-array in a second dimension by $$\text{int}\left(\frac{\text{surface } ID}{2^{\frac{n}{2}} + 1}\right)$$

units, wherein surface ID is the surface identifier and n is the order of the first m-array.

2. The embedded interaction code-enabled display of claim 1, wherein the outer transparency layer comprises at least one of glass, plastic, and a film.

3. The embedded interaction code-enabled display of claim 1, wherein the inner transparency layer comprises at least one of glass, plastic, and a film.

4. The embedded interaction code-enabled display of claim 1, further comprising: glue between the outer transparency layer and the inner transparency layer.

5. The embedded interaction code-enabled display of claim 1, wherein the embedded interaction code dot pattern is at least one of printed on and pressed onto an inner side of the outer transparency layer.

6. The embedded interaction code-enabled display of claim 1, wherein the surface identifier uniquely identifies the embedded interaction code-enabled display.

7. An embedded interaction code-enabled display comprising:
   an outer transparency layer;
   an infrared-reflection layer; and
   an embedded interaction code dot pattern between the outer transparency layer and the infrared-reflection layer, wherein the embedded interaction code dot pattern is generated at least in part by combining a first m-array and a second m-array. wherein the second m-array is generated by shifting the first m-array based on a surface identifier that identifies the embedded interaction code-enabled display and wherein position data and the surface identifier are encoded in the embedded interaction code dot pattern such that the surface identifier and the position of an image capturing device can be determined from a captured portion of the embedded interaction code dot pattern
   wherein generating the second two-dimensional array includes shifting the first two-dimensional array in a second dimension by $$\operatorname{int}\left(\frac{\text{surface } ID}{2^{\frac{n}{2}}+1}\right)$$

units, wherein surface ID is the surface identifier and n is the order of the first two-dimensional array.

8. The embedded interaction code-enabled display of claim 7, wherein the outer transparency layer comprises at least one of glass, plastic, and a film.

9. The embedded interaction code-enabled display of claim 7, further comprising: glue between the outer transparency layer and the infrared-reflection layer.

10. The embedded interaction code-enabled display of claim 7, wherein the embedded interaction code dot pattern is at least one of printed on and pressed onto an inner side of the outer transparency layer.

11. The embedded interaction code-enabled display of claim 7, wherein the encoded surface identifier uniquely identifies the embedded interaction code-enabled display.

12. The embedded interaction code-enabled display of claim 7, wherein generating the second two-dimensional array includes shifting the first two-dimensional array in a first dimension by $$\operatorname{mod}\left(\text{surface } ID, 2^{\frac{n}{2}}+1\right)$$

units, wherein surface ID is the surface identifier and n is the order of the first two-dimensional array.

13. An embedded interaction code-enabled display comprising:
   an outer transparency layer;
   an inner transparency layer;
   an infrared-reflection layer between the outer transparency layer and the inner transparency layer; and
   an embedded interaction code dot pattern between the outer transparency layer and the infrared-reflection layer, wherein position data and a surface identifier that identifies the embedded interaction code-enabled display are encoded in the embedded interaction code dot pattern, wherein the embedded interaction code dot pattern is at least one of printed on and pressed onto an inner side of the outer transparency layer and wherein the embedded interaction code dot pattern is generated at least in part by:
   generating a sequence of numbers,
   generating a first two-dimensional array by folding the generated sequence of numbers,
   generating a second two-dimensional array by shifting the first two-dimensional array in a first dimension and a second dimension based on the surface identifier,
   combining the first two-dimensional array and the second two-dimensional array to generate a combined array, and
   converting numbers of the combined two-dimensional array into graphical elements
   wherein generating the second two-dimensional array includes shifting the first two-dimensional array in the first dimension by mod(surface ID, $2^{n/2}+1$) units, wherein surface ID is the surface identifier and n is the order of the first two-dimensional array.

14. The embedded interaction code-enabled display of claim 13, wherein generating the second two-dimensional array includes shifting the first two-dimensional array in the second dimension by $$\operatorname{int}\left(\frac{\text{surface } ID}{2^{\frac{n}{2}}+1}\right)$$

units, wherein surface ID is the surface identifier and n is the order of the first two-dimensional array.

15. he embedded interaction code-enabled display of claim 13, wherein the outer transparency layer comprises at least one of glass, plastic, and a film.

16. The embedded interaction code-enabled display of claim 13, wherein the inner transparency layer comprises at least one of glass, plastic, and a film.

17. The embedded interaction code-enabled display of claim 13, further comprising: glue between the outer transparency layer and the infrared-reflection layer.

18. The embedded interaction code-enabled display of claim 13, wherein the surface identifier uniquely identifies the embedded interaction code-enabled display.

* * * * *

UNITED STATES PATENT AND TRADEMARK OFFICE
CERTIFICATE OF CORRECTION

PATENT NO. : 7,622,182 B2
APPLICATION NO. : 11/205599
DATED : November 24, 2009
INVENTOR(S) : Wang et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 537 days.

Signed and Sealed this

Twenty-sixth Day of October, 2010

David J. Kappos
*Director of the United States Patent and Trademark Office*